US011166210B2

(12) United States Patent
Zhu et al.

(10) Patent No.: US 11,166,210 B2
(45) Date of Patent: *Nov. 2, 2021

(54) USER EQUIPMENT CAMPING IN A VIRTUAL CELL

(71) Applicant: QUALCOMM Incorporated, San Diego, CA (US)

(72) Inventors: Xipeng Zhu, San Diego, CA (US); Xiaoxia Zhang, San Diego, CA (US); Tom Chin, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,146

(22) Filed: Apr. 3, 2020

(65) Prior Publication Data

US 2020/0314918 A1 Oct. 1, 2020

Related U.S. Application Data

(63) Continuation of application No. 16/831,704, filed on Mar. 26, 2020.

(Continued)

(51) Int. Cl.
*H04W 36/04* (2009.01)
*H04W 36/00* (2009.01)
(Continued)

(52) U.S. Cl.
CPC ........ *H04W 36/04* (2013.01); *G06F 9/45558* (2013.01); *H04W 4/06* (2013.01);
(Continued)

(58) Field of Classification Search
CPC ............... H04W 36/04; H04W 56/001; H04W 56/0045; H04W 72/14; H04W 80/02;
(Continued)

(56) References Cited

U.S. PATENT DOCUMENTS

2009/0232013 A1   9/2009  Kumpula et al.
2010/0329216 A1*  12/2010 Jen ........................ H04W 36/08
                                                      370/332

(Continued)

OTHER PUBLICATIONS

"3rd Generation Partnership Project, Technical Specification Group Radio Access Network, NG-RAN, Architecture description (Release 15)", 3GPP Standard, Technical Specification, 3GPP TS 38.401, 3rd Generation Partnership Project (3GPP), Mobile Competence Centre, 650, Route Des Lucioles, F-06921 Sophia-Antipolis Cedex, France, vol. RAN WG3, No. V15.4.0, Jan. 8, 2019 (Jan. 8, 2019), pp. 1-40, XP051591620, [retrieved on Jan. 8, 2019] paragraphs [6.1.1], [6.1.2] paragraph [08.1]—paragraph [8.2.2.2] paragraph [8.6.1]—paragraph [08.7] paragraph [8.9.4] paragraphs [8.9.6.1], [8.9.6.2].

(Continued)

*Primary Examiner* — Julio R Perez
(74) *Attorney, Agent, or Firm* — Shankar Krithivasan

(57) ABSTRACT

Methods, systems, and devices for wireless communications are described that provide for user equipment (UE) camping in a virtual cell. A UE may camp in a virtual cell and may be in an idle mode or an inactive mode in the virtual cell. The UE may transition out of the idle or inactive mode and switch from camping in the virtual cell to connecting to a physical cell encompassed by the virtual cell through reselection, redirection, and handover procedures. The virtual cell may include a central unit and multiple distributed units, which may be configured in various physical implementations. Additionally, the virtual cell may be limited to broadcast only or selective unicast signaling.

28 Claims, 21 Drawing Sheets

Related U.S. Application Data

(60) Provisional application No. 62/825,674, filed on Mar. 28, 2019.

(51) Int. Cl.
*H04W 48/20* (2009.01)
*H04W 74/08* (2009.01)
*H04W 4/06* (2009.01)
*H04W 76/27* (2018.01)
*G06F 9/455* (2018.01)
*H04W 56/00* (2009.01)
*H04W 72/14* (2009.01)
*H04W 80/02* (2009.01)

(52) U.S. Cl.
CPC ... *H04W 36/0022* (2013.01); *H04W 36/0083* (2013.01); *H04W 48/20* (2013.01); *H04W 56/001* (2013.01); *H04W 56/0045* (2013.01); *H04W 72/14* (2013.01); *H04W 74/0833* (2013.01); *H04W 76/27* (2018.02); *H04W 80/02* (2013.01); *G06F 2009/45595* (2013.01)

(58) Field of Classification Search
CPC ......... H04W 36/0083; H04W 36/0022; H04W 48/20; H04W 74/0833; H04W 4/06; H04W 76/27; H04W 4/70; H04W 4/12; H04W 4/00; H04W 36/06; H04W 36/08; H04W 48/12; H04W 88/085; G06F 9/45558; G06F 2009/45595
See application file for complete search history.

(56) References Cited

U.S. PATENT DOCUMENTS

| | | | |
|---|---|---|---|
| 2012/0129537 A1* | 5/2012 | Liu | H04W 36/0085 455/444 |
| 2012/0135737 A1 | 5/2012 | Yoshihara et al. | |
| 2013/0288677 A1 | 10/2013 | Juuti et al. | |
| 2014/0038607 A1 | 2/2014 | Makharia et al. | |
| 2014/0135018 A1 | 5/2014 | Hedberg et al. | |
| 2019/0037625 A1 | 1/2019 | Shih et al. | |
| 2020/0221354 A1 | 7/2020 | Van Der Zee et al. | |
| 2020/0245291 A1 | 7/2020 | Wei et al. | |
| 2020/0314712 A1 | 10/2020 | Zhu et al. | |
| 2021/0029673 A1 | 1/2021 | Zhang | |

OTHER PUBLICATIONS

Institute for Information Industry (III): "Discussion on System Information Delivery in NR", 3GPP Draft, R1-1610207, Discussion on System Information Delivery in NR, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051150226, 5 pages, Retrieved from the Internet: URL: http://www.3gpp.org/ftp/Meetings_3GPP_SYNC/RAN1/Docs/. [retrieved on Oct. 9, 2016] the whole document.

International Search Report and Written Opinion—PCT/US2020/025401—ISAEPO—dated Sep. 10, 2020 (191700WO).

Partial International Search Report—PCT/US2020/025401—ISA/EPO—dated Jul. 14, 2020 (191700WO).

* cited by examiner

USER EQUIPMENT CAMPING IN A VIRTUAL CELL

CROSS REFERENCE

The present application for Patent is a Continuation of U.S. patent application Ser. No. 16/831,704 by XHU et al., entitled "USER EQUIPMENT CAMPING IN A VIRTUAL CELL" filed Mar. 26, 2020, which claims the benefit of U.S. Provisional Patent Application No. 62/825,674 by ZHU et al., entitled "USER EQUIPMENT CAMPING IN A VIRTUAL CELL," filed Mar. 28, 2019, assigned to the assignee hereof, and expressly incorporated by reference herein.

BACKGROUND

The following relates generally to wireless communications, and more specifically to user equipment (UE) camping in a virtual cell.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UE.

In wireless communications systems, a UE may be connected to or be in communication with a cell or a base station. In some instances, the UE may be in an idle mode or in an inactive mode. When the UE wakes up or transitions out of the idle mode or inactive mode, the UE may perform a cell selection or reselection in order to connect with a cell or base station. The cell selection may include performing signal measurements of one or more cells, including the cell with which the UE was already connected to when the UE transitioned into the idle or inactive mode, as well as other cells whose coverage area the UE may have moved into while in the idle or inactive mode. Performing these signal measurements may undesirably consume power. Further, unnecessary connection latency may be introduced in the connecting to or the resuming of the connection to a cell due to the performance of the signal measurements. A method for connecting to or resuming connection to a cell that reduces the need for performing pre-connection measurements may therefore be desirable.

SUMMARY

The described techniques relate to improved methods, systems, devices, and apparatuses that support user equipment (UE) camping in a virtual cell. Generally, the described techniques provide for a UE which may be camped in a virtual cell in an idle mode or an inactive mode and which may then transition out of the idle or inactive mode to a connection with a physical cell which may be part of the virtual cell. The UE may transition out of the idle or inactive mode and switch from camping in the virtual cell and connect to a physical cell through reselection, redirection, and handover procedures. In some examples, the UE may be directed from camping in the virtual cell to the physical cell via radio resource control (RRC) connection establishment/resume signaling.

In some examples, the virtual cell may include a central unit (CU) and one or more distributed units (DUs). The CU and the DUs of the virtual cell may be configured in various implementations such as in an intra-CU coordination implementation, an intra-DU coordination implementation, and an intra low-layer split CU implementation. In some cases, signaling between the CU and the DUs may be introduced in order to coordinate the virtual cell configuration.

A method of wireless communication at a UE is described. The method may include identifying a first cell for the UE to connect to, the first cell being a virtual cell with a coverage area that includes a set of physical cells and corresponding physical cell coverage areas, initiating a transition to a connected mode with the first cell via a random access procedure, and connecting with one of the set of physical cells during the random access procedure and based on the first cell being the virtual cell and the UE attempting to transition to the connected mode with the first cell.

An apparatus for wireless communication at a UE is described. The apparatus may include a processor, memory coupled to the processor, and instructions stored in the memory. The instructions may be executable by the processor to cause the apparatus to identify a first cell for the UE to connect to, the first cell being a virtual cell with a coverage area that includes a set of physical cells and corresponding physical cell coverage areas, initiate a transition to a connected mode with the first cell via a random access procedure, and connect with one of the set of physical cells during the random access procedure and based on the first cell being the virtual cell and the UE attempting to transition to the connected mode with the first cell.

Another apparatus for wireless communication at a UE is described. The apparatus may include means for identifying a first cell for the UE to connect to, the first cell being a virtual cell with a coverage area that includes a set of physical cells and corresponding physical cell coverage areas, initiating a transition to a connected mode with the first cell via a random access procedure, and connecting with one of the set of physical cells during the random access procedure and based on the first cell being the virtual cell and the UE attempting to transition to the connected mode with the first cell.

A non-transitory computer-readable medium storing code for wireless communication at a UE is described. The code may include instructions executable by a processor to identify a first cell for the UE to connect to, the first cell being a virtual cell with a coverage area that includes a set of physical cells and corresponding physical cell coverage areas, initiate a transition to a connected mode with the first cell via a random access procedure, and connect with one of the set of physical cells during the random access procedure and based on the first cell being the virtual cell and the UE attempting to transition to the connected mode with the first cell.

Some examples of the method, apparatuses, and non-transitory computer-readable medium described herein may further include operations, features, means, or instructions for identifying that the first cell may be the virtual cell.

Some examples of the method, apparatuses, and non-transitory computer-readable medium described herein may further include operations, features, means, or instructions for monitoring for at least one of a synchronization signal block (SSB) or a system information block (SIB) of the first cell, and identifying, based on the SSB or SIB of the first cell, that transmissions from the first cell may be limited to either broadcast only or selective unicast.

In some examples of the method, apparatuses, and non-transitory computer-readable medium described herein, connecting with one of the set of physical cells may include operations, features, means, or instructions for receiving an radio resource control (RRC) configuration, and identifying, based on the RRC configuration, that transmissions from the first cell may be UE-specific transmissions.

Some examples of the method, apparatuses, and non-transitory computer-readable medium described herein may further include operations, features, means, or instructions for receiving, from the first cell, at least one of a master information block (MIB) or a SIB of the set of physical cells of the first cell.

In some examples of the method, apparatuses, and non-transitory computer-readable medium described herein, initiating the transition to the connected mode with the first cell further may include operations, features, means, or instructions for transitioning from an idle mode or from an inactive mode to the connected mode with the first cell.

Some examples of the method, apparatuses, and non-transitory computer-readable medium described herein may further include operations, features, means, or instructions for receiving an indication that transmissions from the first cell may be limited to either broadcast only or selective unicast. Some examples may also include failing to interpret the indication due to lack of support by the UE for virtual cell connections.

In some examples of the method, apparatuses, and non-transitory computer-readable medium described herein, connecting with one of the set of physical cells during the random access procedure may include operations, features, means, or instructions for receiving redirection information in an RRC reject message from the first cell, and redirecting to the one of the set of physical cells in accordance with the redirection information.

In some examples of the method, apparatuses, and non-transitory computer-readable medium described herein, connecting with one of the set of physical cells during the random access procedure may include operations, features, means, or instructions for receiving a random access response from the first cell, where the random access response includes a timing advance and an uplink resource grant for communications with the one of the set of physical cells.

Some examples of the method, apparatuses, and non-transitory computer-readable medium described herein may further include operations, features, means, or instructions for receiving, from the first cell and via an RRC reconfiguration message, handover information to allow the UE to communicate via RRC communications with the one of the set of physical cells.

Some examples of the method, apparatuses, and non-transitory computer-readable medium described herein may further include operations, features, means, or instructions for communications between receipt of the random access response from the first cell and receipt of the RRC reconfiguration message from the first cell may be split such that UE RRC-layer communications may be with the first cell but that lower-than-RRC-layer communications by the UE may be with the one of the set of physical cells.

Some examples of the method, apparatuses, and non-transitory computer-readable medium described herein may further include operations, features, means, or instructions for receiving an indication that transmissions from the first cell may be limited to either broadcast only or selective unicast, and interpreting the indication based on the UE having support for virtual cell connections.

In some examples of the method, apparatuses, and non-transitory computer-readable medium described herein, initiating the transition to the connected mode with the first cell via the random access procedure where connecting with one of the set of physical cells during the random access procedure may include operations, features, means, or instructions for indicating to the first cell and via a random access request message that the UE may have support for virtual cell connections.

In some examples of the method, apparatuses, and non-transitory computer-readable medium described herein, connecting with one of the set of physical cells during the random access procedure may include operations, features, means, or instructions for receiving a random access response from the first cell, where the random access response includes a timing advance, an uplink resource grant for communications with the one of the set of physical cells, and handover information for the UE to communicate with the one of the set of physical cells.

In some examples of the method, apparatuses, and non-transitory computer-readable medium described herein, the handover information includes one or more of a random access preamble identifier (RAPID), a target cell index of the one of the set of physical cells, or bandwidth part information.

In some examples of the method, apparatuses, and non-transitory computer-readable medium described herein, the handover information may be included within a medium access control (MAC) control element (CE) of the random access response.

In some examples of the method, apparatuses, and non-transitory computer-readable medium described herein, connecting with one of the set of physical cells during the random access procedure may include operations, features, means, or instructions for receiving a random access response from the first cell, where the random access response includes a timing advance and an uplink resource grant for communications with the one of the set of physical cells, and transmitting, to the one of the set of physical cells and response to the random access response, an RRC setup request.

In some examples of the method, apparatuses, and non-transitory computer-readable medium described herein, connecting with one of the set of physical cells during the random access procedure further may include operations, features, means, or instructions for receiving, in response to the RRC setup request, an RRC setup message that includes handover information for lower-than-RRC-layer communications by the UE with the one of the set of physical cells.

A method of wireless communication at a first cell is described. The method may include identifying that the first cell is a virtual cell with a coverage area that includes a set of physical cells and corresponding physical cell coverage areas, receiving, from a UE, a random access message as part of a random access procedure for transitioning the UE to a connected mode with the first cell, and providing, to the UE and in response to the random access message, information to either handover or redirect the UE to one of the set of physical cells within the coverage area of the first cell.

An apparatus for wireless communication at a first cell is described. The apparatus may include a processor, memory coupled to the processor, and instructions stored in the memory. The instructions may be executable by the processor to cause the apparatus to identify that the first cell is a virtual cell with a coverage area that includes a set of physical cells and corresponding physical cell coverage areas, receive, from a UE, a random access message as part of a random access procedure for transitioning the UE to a connected mode with the first cell, and provide, to the UE and in response to the random access message, information to either handover or redirect the UE to one of the set of physical cells within the coverage area of the first cell.

Another apparatus for wireless communication at a first cell is described. The apparatus may include means for identifying that the first cell is a virtual cell with a coverage area that includes a set of physical cells and corresponding physical cell coverage areas, receiving, from a UE, a random access message as part of a random access procedure for transitioning the UE to a connected mode with the first cell, and providing, to the UE and in response to the random access message, information to either handover or redirect the UE to one of the set of physical cells within the coverage area of the first cell.

A non-transitory computer-readable medium storing code for wireless communication at a first cell is described. The code may include instructions executable by a processor to identify that the first cell is a virtual cell with a coverage area that includes a set of physical cells and corresponding physical cell coverage areas, receive, from a UE, a random access message as part of a random access procedure for transitioning the UE to a connected mode with the first cell, and provide, to the UE and in response to the random access message, information to either handover or redirect the UE to one of the set of physical cells within the coverage area of the first cell.

Some examples of the method, apparatuses, and non-transitory computer-readable medium described herein may further include operations, features, means, or instructions for identifying signaling for transmission to the UE that may be limited to either broadcast only or selective unicast, and transmitting the identified signaling via at least one of a SSB or a SIB to the UE.

In some examples of the method, apparatuses, and non-transitory computer-readable medium described herein, providing, to the UE and in response to the random access message, information to either handover or redirect the UE further may include operations, features, means, or instructions for identifying a specific UE for receiving a UE-specific transmission, and transmitting an RRC configuration in the UE-specific transmission.

Some examples of the method, apparatuses, and non-transitory computer-readable medium described herein may further include operations, features, means, or instructions for transmitting, to the UE, at least one of a MIB or a SIB of the set of physical cells of the first cell.

In some examples of the method, apparatuses, and non-transitory computer-readable medium described herein, providing, to the UE and in response to the random access message, information to either handover or redirect the UE further may include operations, features, means, or instructions for transmitting information to the UE to transition from an idle mode or from an inactive mode to the connected mode with the first cell.

Some examples of the method, apparatuses, and non-transitory computer-readable medium described herein may further include operations, features, means, or instructions for transmitting an indication that may be limited to either broadcast only or selective unicast. Some examples may also include failing to receive acknowledgement of the indication, from the UE, due to lack of support by the UE for virtual cell connections.

In some examples of the method, apparatuses, and non-transitory computer-readable medium described herein, providing, to the UE and in response to the random access message, information to either handover or redirect the UE further may include operations, features, means, or instructions for providing information, to the UE, via the random access message that includes a timing advance and an uplink resource grant for communications with the one of the set of physical cells.

Some examples of the method, apparatuses, and non-transitory computer-readable medium described herein may further include operations, features, means, or instructions for transmitting, to the UE and via an RRC reconfiguration message, handover information to allow the UE to communicate via RRC communications with the one of the set of physical cells.

Some examples of the method, apparatuses, and non-transitory computer-readable medium described herein may further include operations, features, means, or instructions for communications between transmission of the random access message and transmission of the RRC reconfiguration message may be split such that RRC-layer communications may be via the first cell but that lower-than-RRC-layer communications may be via one of the set of physical cells.

In some examples of the method, apparatuses, and non-transitory computer-readable medium described herein, providing, to the UE and in response to the random access message, information to either handover or redirect the UE further may include operations, features, means, or instructions for transmitting redirection information in an RRC reject message to the UE, and redirecting the UE to the one of the set of physical cells in accordance with the redirection information.

Some examples of the method, apparatuses, and non-transitory computer-readable medium described herein may further include operations, features, means, or instructions for communicating an indication that transmissions from the first cell may be limited to either broadcast only or selective unicast, and receiving receipt acknowledgment of the indication, from the UE, based on the UE having support for virtual cell connections.

Some examples of the method, apparatuses, and non-transitory computer-readable medium described herein may further include operations, features, means, or instructions for receiving an indication from the UE via the random access message that the UE may have support for virtual cell connections.

In some examples of the method, apparatuses, and non-transitory computer-readable medium described herein, providing, to the UE and in response to the random access message, information to either handover or redirect the UE further may include operations, features, means, or instructions for transmitting a random access response to the UE, where the random access response includes a timing advance, an uplink resource grant for communications with the one of the set of physical cells, and handover information for the UE to communicate with the one of the set of physical cells.

In some examples of the method, apparatuses, and non-transitory computer-readable medium described herein, the handover information includes one or more of a RAPID, a target cell index of the one of the set of physical cells, or bandwidth part information.

In some examples of the method, apparatuses, and non-transitory computer-readable medium described herein, the handover information may be included within a MAC CE of the random access response.

In some examples of the method, apparatuses, and non-transitory computer-readable medium described herein, providing, to the UE and in response to the random access message, information to either handover or redirect the UE further may include operations, features, means, or instructions for transmitting a random access response to the UE, where the random access response includes a timing advance and an uplink resource grant for communications with the one of the set of physical cells, and receiving, at one of the set of physical cells, an RRC setup request.

Some examples of the method, apparatuses, and non-transitory computer-readable medium described herein may further include operations, features, means, or instructions for transmitting, in response to the RRC setup request, an RRC setup message that includes handover information for lower-than-RRC-layer communications by the UE with the one of the set of physical cells.

In some examples of the method, apparatuses, and non-transitory computer-readable medium described herein, the first cell may be supported by a central unit and one or more distributed units associated with the central unit.

In some examples of the method, apparatuses, and non-transitory computer-readable medium described herein, the first cell may be supported by a set of distributed units associated with a single central unit.

In some examples of the method, apparatuses, and non-transitory computer-readable medium described herein, the first cell may be supported by a set of lower-layer split distributed units associated with a single lower-layer split central unit.

Some examples of the method, apparatuses, and non-transitory computer-readable medium described herein may further include operations, features, means, or instructions for communicating a cell type in a system information block 1 via broadcast only signaling.

Some examples of the method, apparatuses, and non-transitory computer-readable medium described herein may further include operations, features, means, or instructions for broadcasting at least one of a master information block or system information block of at least one of the set of physical cells.

Some examples of the method, apparatuses, and non-transitory computer-readable medium described herein may further include operations, features, means, or instructions for communicating a unicast permission to the UE, where the unicast permission may be communicated to the UE via dedicated radio resource configuration signaling.

A method of wireless communication at a distributed unit associated with a central unit is described. The method may include identifying a virtual cell configuration for the distributed unit, where the virtual cell configuration provides one or more UEs a virtual cell with a coverage area that includes a set of physical cells and corresponding physical cell coverage areas and communicating with the one or more UEs in accordance with the virtual cell configuration.

An apparatus for wireless communication at a distributed unit associated with a central unit is described. The apparatus may include a processor, memory coupled to the processor, and instructions stored in the memory. The instructions may be executable by the processor to cause the apparatus to identify a virtual cell configuration for the distributed unit, where the virtual cell configuration provides one or more UEs a virtual cell with a coverage area that includes a set of physical cells and corresponding physical cell coverage areas and communicate with the one or more UEs in accordance with the virtual cell configuration.

Another apparatus for wireless communication at a distributed unit associated with a central unit is described. The apparatus may include means for identifying a virtual cell configuration for the distributed unit, where the virtual cell configuration provides one or more UEs a virtual cell with a coverage area that includes a set of physical cells and corresponding physical cell coverage areas and communicating with the one or more UEs in accordance with the virtual cell configuration.

A non-transitory computer-readable medium storing code for wireless communication at a distributed unit associated with a central unit is described. The code may include instructions executable by a processor to identify a virtual cell configuration for the distributed unit, where the virtual cell configuration provides one or more UEs a virtual cell with a coverage area that includes a set of physical cells and corresponding physical cell coverage areas and communicate with the one or more UEs in accordance with the virtual cell configuration.

In some examples of the method, apparatuses, and non-transitory computer-readable medium described herein, identifying the virtual cell configuration further may include operations, features, means, or instructions for receiving the virtual cell configuration via one or more messages from the central unit.

In some examples of the method, apparatuses, and non-transitory computer-readable medium described herein, the virtual cell configuration enables the distributed unit, the associated central unit, and other distributed units associated with the central unit to support virtual cell communications with the one or more UEs.

Some examples of the method, apparatuses, and non-transitory computer-readable medium described herein may further include operations, features, means, or instructions for receiving one or more coordination messages from the central unit, coordinating the distributed unit and the other distributed units to function with the central unit as the virtual cell, and broadcasting messages to the one or more UEs in accordance with the one or more coordination messages.

In some examples of the method, apparatuses, and non-transitory computer-readable medium described herein, the distributed unit may be a gNodeB, and where the other distributed units and the central unit may be each separate gNodeBs.

In some examples of the method, apparatuses, and non-transitory computer-readable medium described herein, the distributed unit may be a gNodeB, the other distributed units may be also separate gNodeBs, and where the central unit may be part of a central unit-distributed unit pair.

Some examples of the method, apparatuses, and non-transitory computer-readable medium described herein may further include operations, features, means, or instructions for communicating with the central unit via an F1 interface for receipt of at least one of resource reservation, the virtual cell configuration, or broadcast scheduling.

In some examples of the method, apparatuses, and non-transitory computer-readable medium described herein, the virtual cell configuration enables the distributed unit to support virtual cell communications with the one or more UEs, the distributed unit having a set of intra-frequency cells that form the virtual cell.

In some examples of the method, apparatuses, and non-transitory computer-readable medium described herein, the distributed unit may be a lower-layer split distributed unit, and where the virtual cell configuration enables the lower-layer split distributed unit and other lower-layer split distributed units, each associated with the central unit, to support virtual cell communications with the one or more UEs.

A method of wireless communication at a central unit associated with a set of distributed units is described. The method may include identifying a virtual cell configuration for the central unit, where the virtual cell configuration provides one or more UEs, a virtual cell with a coverage area that includes a set of physical cells and corresponding physical cell coverage areas and communicating with the set of distributed units in accordance with the virtual cell configuration.

An apparatus for wireless communication at a central unit associated with a set of distributed units is described. The apparatus may include a processor, memory coupled to the processor, and instructions stored in the memory. The instructions may be executable by the processor to cause the apparatus to identify a virtual cell configuration for the central unit, where the virtual cell configuration provides one or more UEs, a virtual cell with a coverage area that includes a set of physical cells and corresponding physical cell coverage areas and communicate with the set of distributed units in accordance with the virtual cell configuration.

Another apparatus for wireless communication at a central unit associated with a set of distributed units is described. The apparatus may include means for identifying a virtual cell configuration for the central unit, where the virtual cell configuration provides one or more UEs, a virtual cell with a coverage area that includes a set of physical cells and corresponding physical cell coverage areas and communicating with the set of distributed units in accordance with the virtual cell configuration.

A non-transitory computer-readable medium storing code for wireless communication at a central unit associated with a set of distributed units is described. The code may include instructions executable by a processor to identify a virtual cell configuration for the central unit, where the virtual cell configuration provides one or more UEs, a virtual cell with a coverage area that includes a set of physical cells and corresponding physical cell coverage areas and communicate with the set of distributed units in accordance with the virtual cell configuration.

In some examples of the method, apparatuses, and non-transitory computer-readable medium described herein, identifying the virtual cell configuration further may include operations, features, means, or instructions for transmitting the virtual cell configuration via one or more messages to a distributed unit of the set of distributed units.

In some examples of the method, apparatuses, and non-transitory computer-readable medium described herein, the virtual cell configuration enables the central unit, an associated distributed unit of the set of distributed units, and other distributed units of the set of distributed units associated with the central unit to support virtual cell communications with the one or more UEs.

Some examples of the method, apparatuses, and non-transitory computer-readable medium described herein may further include operations, features, means, or instructions for transmitting one or more coordination messages to a distributed unit of the set of distributed units to coordinate the distributed unit and the other distributed units of the set of distributed units to function with the central unit as the virtual cell, and broadcasting messages to the one or more UEs in accordance with the one or more coordination messages.

In some examples of the method, apparatuses, and non-transitory computer-readable medium described herein, the distributed unit of the set of distributed units may be a gNodeB, and where the other distributed units of the set of distributed units and the central unit may be each separate gNodeBs.

In some examples of the method, apparatuses, and non-transitory computer-readable medium described herein, the distributed unit of the set of distributed units may be a gNodeB, the other distributed units of the set of distributed units may be also separate gNodeBs, and where the central unit may be part of a central unit-distributed unit pair.

Some examples of the method, apparatuses, and non-transitory computer-readable medium described herein may further include operations, features, means, or instructions for communicating with the distributed unit of the set of distributed units via an F1 interface for receipt of at least one of resource reservation, the virtual cell configuration, or broadcast scheduling.

In some examples of the method, apparatuses, and non-transitory computer-readable medium described herein, a distributed unit of the set of distributed units may be a lower-layer split distributed unit, and where the virtual cell configuration enables the lower-layer split distributed unit and other lower-layer split distributed units, each associated with the central unit, to support virtual cell communications with the one or more UEs.

A method for wireless communication at a base station coupled with a plurality of other base stations is described. The method may include identifying a virtual cell configuration for the base station, wherein the virtual cell configuration provides one or more UEs with a virtual cell having a coverage area that includes a plurality of physical cells and corresponding physical cell coverage areas and communicating with the one or more UEs or at least one of the plurality of other base stations in accordance with the virtual cell configuration.

An apparatus for wireless communication at a base station coupled with a plurality of other base stations is described. The apparatus may include a processor, memory coupled to the processor, and instructions stored in the memory. The instructions may be executable by the processor to cause the apparatus to identifying a virtual cell configuration for the base station, wherein the virtual cell configuration provides one or more UEs with a virtual cell having a coverage area that includes a plurality of physical cells and corresponding physical cell coverage areas and communicate with the one or more UEs or at least one of the plurality of other base stations in accordance with the virtual cell configuration.

Another apparatus for wireless communication at a base station coupled with a plurality of other base stations is described. The apparatus may include means for identifying a virtual cell configuration for the base station, wherein the virtual cell configuration provides one or more UEs with a virtual cell having a coverage area that includes a plurality of physical cells and corresponding physical cell coverage areas and communicating with the one or more UEs or at least one of the plurality of other base stations in accordance with the virtual cell configuration.

A non-transitory computer-readable medium storing code for wireless communication at a base station coupled with a plurality of other base stations is described. The code may include instructions executable by a processor to identify a virtual cell configuration for the base station, wherein the virtual cell configuration provides one or more UEs with a virtual cell having a coverage area that includes a plurality of physical cells and corresponding physical cell coverage areas and communicate with the one or more UEs or at least one of the plurality of other base stations in accordance with the virtual cell configuration.

In some examples of the method, apparatuses, and non-transitory computer-readable medium described herein, identifying the virtual cell configuration further includes receiving the virtual cell configuration via one or more messages from a central unit coupled with the base station.

In some examples of the method, apparatuses, and non-transitory computer-readable medium described herein, identifying the virtual cell configuration further includes transmitting the virtual cell configuration via one or more messages to a base station of the plurality of other base stations.

In some examples of the method, apparatuses, and non-transitory computer-readable medium described herein, identifying the virtual cell configuration further includes transmitting the virtual cell configuration via one or more messages to a base station of the plurality of other base stations.

In some examples of the method, apparatuses, and non-transitory computer-readable medium described herein, the virtual cell configuration enables the base station, a central unit associated with the base station and at least a subset of the plurality of other base stations, and the subset of the plurality of other base stations associated with the central unit to support virtual cell communications with the one or more UEs.

Some examples of the method, apparatuses, and non-transitory computer-readable medium described herein may further include operations, features, means, or instructions for receiving one or more coordination messages from the central unit, coordinating the base station and the plurality of other base stations to function with the central unit as the virtual cell and broadcasting messages to the one or more UEs in accordance with the one or more coordination messages.

In some examples of the method, apparatuses, and non-transitory computer-readable medium described herein, the central unit is one of the plurality of other base stations, wherein the base station is a gNodeB, and wherein the plurality of other base stations are each separate gNodeBs.

In some examples of the method, apparatuses, and non-transitory computer-readable medium described herein, the central unit is part of a central unit-distributed unit pair.

Some examples of the method, apparatuses, and non-transitory computer-readable medium described herein may further include operations, features, means, or instructions for communicating with the central unit via an F1 interface for receipt of at least one of a resource reservation, the virtual cell configuration, or a broadcast scheduling.

In some examples of the method, apparatuses, and non-transitory computer-readable medium described herein, the virtual cell configuration enables the base station to support virtual cell communications with the one or more UEs, the base station having a plurality of intra-frequency cells that form the virtual cell.

In some examples of the method, apparatuses, and non-transitory computer-readable medium described herein, the base station is a lower-layer split distributed unit, the plurality of other base stations are lower-layer split distributed units, and wherein the virtual cell configuration enables the lower-layer split distributed unit and the other lower-layer split distributed units, each associated with a central unit, to support virtual cell communications with the one or more UEs.

Some examples of the method, apparatuses, and non-transitory computer-readable medium described herein may further include operations, features, means, or instructions for, when the base station is a central unit, transmitting one or more coordination messages to a second base station of the plurality of other base stations to coordinate the second base station and the other base stations of the plurality of base stations to function with the central unit as the virtual cell, and broadcasting messages to the one or more UEs in accordance with the one or more coordination messages.

DETAILED DESCRIPTION

Figure 1:
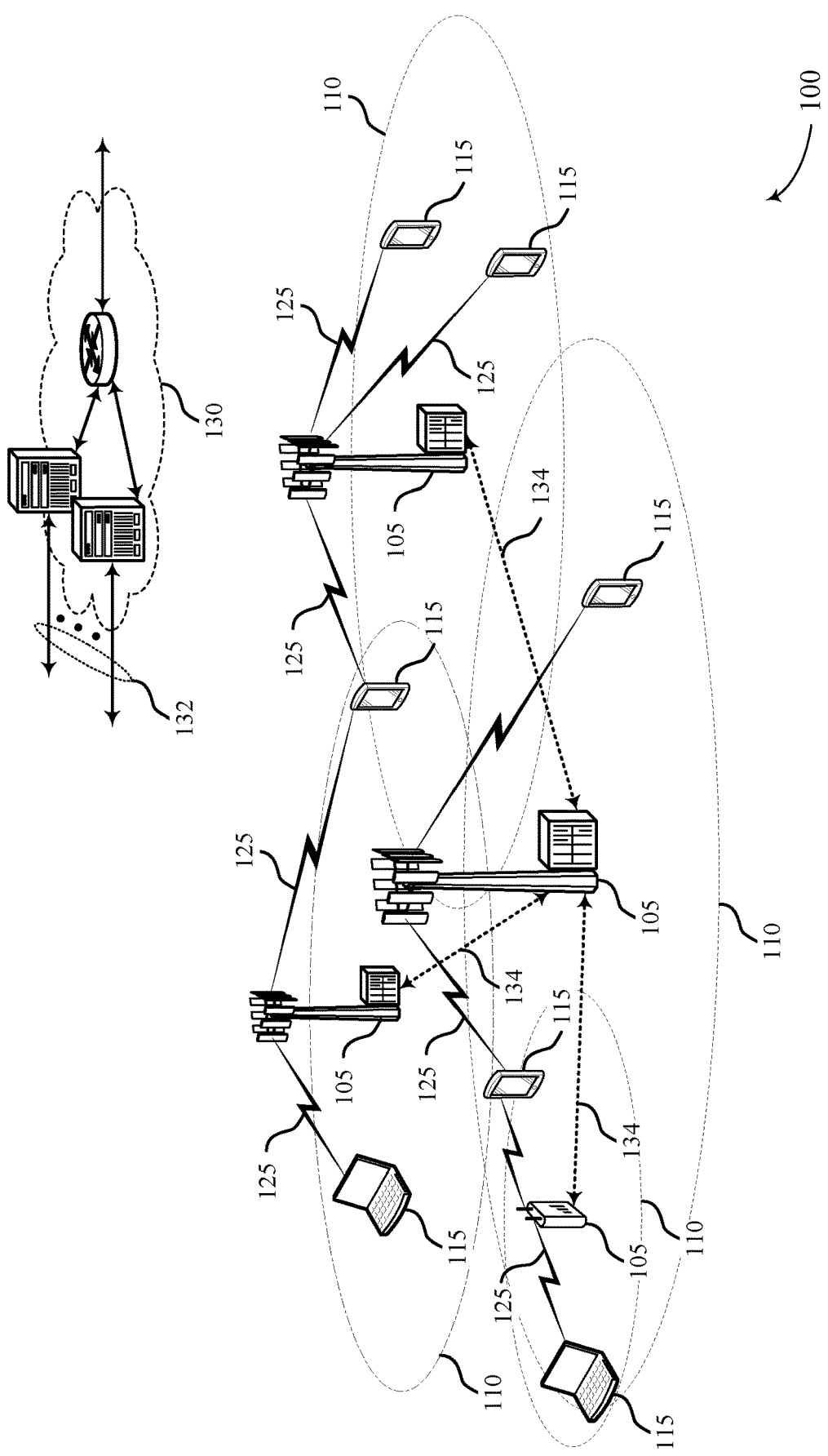
FIG. 1 illustrates an example of a system for wireless communications that supports user equipment (UE) camping in a virtual cell in accordance with aspects of the present disclosure.

In some wireless communications systems, a user equipment (UE) may camp in a virtual cell. The UE may be in an idle mode or an inactive mode while the UE is camping in the virtual cell. The virtual cell may include one or more physical cells and the virtual cell may have a coverage area that includes the corresponding coverage areas of the physical cells. When the UE transitions out of the idle or inactive mode, the UE may switch from camping in the virtual cell and may connect to a physical cell.

In some examples, when the UE is in an idle mode or in an inactive mode and the UE wakes up or transitions out of the idle mode or inactive mode, the UE may perform a cell selection or reselection. The cell selection may include performing associated signal measurements of signaling from one or more cells. For example, if the UE has moved from a first cell to a second cell while the UE was in an idle or inactive mode, the UE will identify the second cell through associated measurements. Each time the UE is within the coverage area of a new cell, the UE may need to repeat the various cell reselection measurements. By performing these signal measurements, the UE may undesirably consume power. Further, unnecessary connection latency may be introduced into the cell reselection process. However, when a UE is camped on a virtual cell that includes the various physical cells with which the UE may connect, the UE may determine that no change of cell has occurred, as each time the UE awakens it may still be connected to the same virtual cell (even if the UE has moved to different coverage areas of respective physical cells encompassed by the virtual cell). Thus, a method which may reduce power consumption and increase broadcast and paging efficiency may include allowing the UE to camp on a virtual cell.

In some examples, the UE may receive broadcast signaling from the virtual cell which may include master information blocks (MIBs) and system information blocks (SIBs) of the physical cells included within the virtual cell. The physical cell information received at the UE may allow the UE to quickly switch and connect to one of the physical cells. In one example, the UE may be a legacy or non-supporting UE (meaning a UE that is not capable of recognizing whether it has connected to a virtual cell) and after receiving the broadcast signaling from the virtual cell, the legacy UE may be directed to a normal physical cell in the virtual cell by handover or redirection. In another example, the UE may be a supporting UE (meaning a UE that is capable of recognizing whether it has connected to a virtual cell), which may reselect a normal physical cell after receiving the broadcast signaling from the virtual cell, or the supporting UE may initiate a random access procedure and may be directed to a physical cell by the network through various signaling between the UE and the virtual cell.

Aspects of the disclosure are initially described in the context of a wireless communications system. Example wireless communications systems for transitioning a UE from a virtual cell to a physical cell and process flows for implementing techniques discussed herein are described. Aspects of the disclosure are further illustrated by and described with reference to system diagrams and flowcharts that relate to UE camping in a virtual cell.

FIG. 1 illustrates an example of a wireless communications system 100 that supports UE camping in a virtual cell in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some example, UE 115 may camp on a cell associated with a base station 105, meaning that the UE 115 is connected to the cell, but that the UE 115 is in an idle or inactive mode. In some examples, UE 115 may camp in a virtual cell which may encompass multiple physical cells. UE 115 may awaken and may attempt to transition to the connected mode with the virtual cell. UE 115 may receive broadcast signaling from the virtual cell and, in the case of a supporting UE 115, may transition out of the idle or inactive mode and switch to connecting to a physical cell through reselection, redirection, or handover procedures. In some examples, a supporting UE 115 may reselect a normal physical cell after receiving the broadcast signaling from the virtual cell.

In some examples, the transition may be achieved via a random access procedure. The supporting UE 115 may initiate a random access procedure and then the network may direct UE 115 to a physical cell of the virtual cell network through various signaling. In some cases, the signaling may be a random access response from the virtual cell to the supporting UE 115, which may include the uplink resource grant of the physical cell and UE 115 may be handed over from the virtual cell to the physical cell. In some examples, the signaling may be an RRC reject message from the virtual cell to UE 115 in which UE 115 may be redirected to the physical cell. In some examples, the signaling may be a random access response message from the virtual cell to UE 115 and may employ a MAC control element for handover. In some examples, the signaling may be a handover command which may be included in the RRC setup message from the physical cell to UE 115. In this example, the handover command may be constructed by the virtual cell and then communicated to the physical cell for transmission to UE 115.

One method for performing UE camping in a virtual cell may include identifying a first cell for UE 115 to connect to, where the virtual cell may have one or more physical cells, and may include a coverage area that includes the corresponding coverage areas of the physical cells. UE 115 may initiate a transition to a connected mode with the virtual cell via a random access procedure and may connect with a physical cell during the random access procedure.

Another method for performing UE camping in a virtual cell may include identifying a virtual cell with a coverage area that includes one or more physical cells and the corresponding physical cell coverage area. The virtual cell may receive a random access message as part of a random access procedure for transitioning UE 115 to a connected mode and the virtual cell may provide, to UE 115, information to either handover or redirect UE 115 to a physical cell of the virtual cell.

Another method for supporting UE camping in a virtual cell may include identifying, at a DU, the virtual cell configuration for the DU, where the virtual cell may have a coverage area which may include one or more physical cells and the corresponding physical cell coverage area and communicating with the one or more UEs 115 in accordance with the virtual cell configuration.

Another method for supporting UE camping in a virtual cell may include identifying, at a CU, the virtual cell configuration for the CU, where the virtual cell may have a coverage area which may include one or more physical cells and the corresponding physical cell coverage area and communicating with one or more of the DUs in accordance with the virtual cell configuration.

Figure 2:
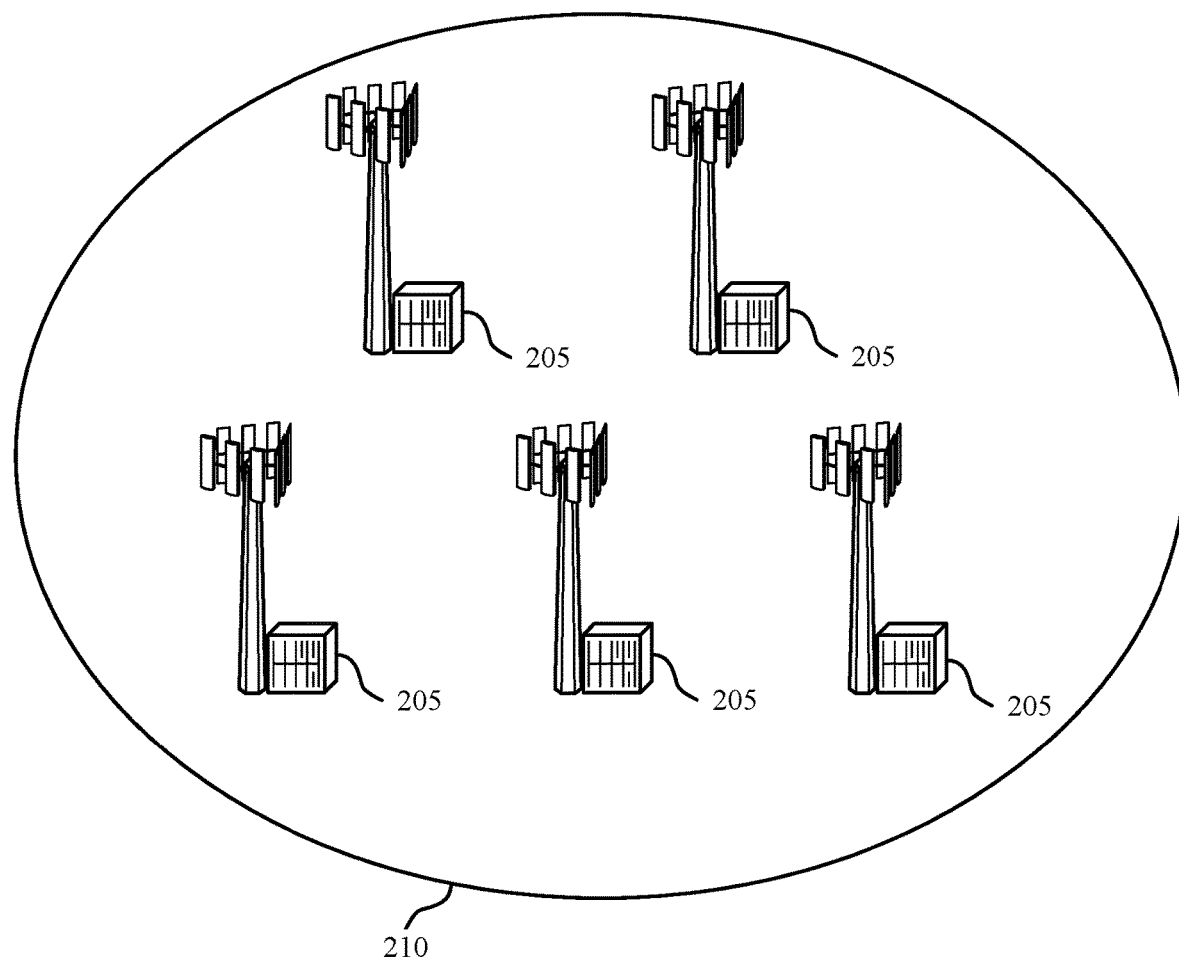
FIG. 2 illustrates an example of a wireless communications system that supports UE camping in a virtual cell in accordance with aspects of the present disclosure.

FIG. 2 illustrates an example of a wireless communications system 200 that supports UE camping in a virtual cell in accordance with aspects of the present disclosure. In some examples, wireless communications system 200 may implement aspects of wireless communication system 100. In the example of FIG. 2, the wireless communication system 200 may include physical cells 205 associated with one or more base stations, which may be examples of a base station 105 of FIG. 1.

FIG. 2 includes a representation of a virtual cell 210 which may include one or more physical cells 205. In FIG. 2, physical cells 205 may be cells, or small cells, or any other combination of an appropriate wireless communications cell or station. Virtual cell 210 may be a cell over a group of physical cells 205 with respect to a single frequency network (SFN) and/or coordinated multipoint (CoMP) transmissions. In some examples, virtual cell 210 may have a coverage area that may be similar to a multicast broadcast single frequency network (MBSFN). However, in some respects, virtual cell 210 may differ from an MBSFN in that an MBSFN may broadcast aspects of information that may be common to each of the physical cells 205 within the MBSFN area, and virtual cell 210 broadcasts information such that virtual cell 210 appears as a normal physical cell from the UE perspective. In one example, virtual cell 210 may appear as a normal physical cell from the UE perspective as the UE may receive broadcast synchronization signals from virtual cell 210 similar to broadcast synchronization signals the UE would receive from a base station or normal physical cell 205. Synchronization signaling from virtual cell 210 will be discussed in further detail herein.

In some examples of FIG. 2, the resource allocation of virtual cell 210 may be similar to that of the MBSFN subframe/subcarrier. For example, each physical cell 205 of FIG. 2 may reserve the same time resource blocks and/or frequency resource blocks for virtual cell 210. By reserving the same time and frequency resource blocks, virtual cell 210 may appear to neighboring normal cells as a single, normal physical cell. Additionally, if the frequency and time resource blocks were not coordinated amongst physical cells 205 of virtual cell 210, then the signaling from physicals cells 205 may interfere with one another. Thus, intra-frequency signaling deployment amongst physical cells 205, via virtual cell 210, may mitigate interference issues.

In some examples, virtual cell 210 may communicate or transmit signaling to one or more UEs, which may be legacy UEs (e.g., non-supporting UEs) or supporting UEs. In some examples, and from the perspective of a legacy UE, there may not be any detectable distinctions between virtual cell 210 and a normal physical cell 205, so virtual cell 210 may appear as a normal physical cell 205 to a legacy UE. In some examples, virtual cell 210 may communicate an indication to the UE that transmissions may be limited to either broadcast only or selective unicast and virtual cell 210 may fail to receive acknowledgement of the indication from the UE. In this example, the UE may lack support for virtual cell connections and may be referred to herein as a legacy UE.

Alternatively, supporting UEs may recognize that virtual cell 210 is different than a physical cell 205. Virtual cell 210 may appear as a normal physical cell to the supporting UEs, except that the UEs may recognize that virtual cell 210 may be broadcast only. In some examples, the broadcast signaling received by the UE from virtual cell 210 may be perceived as SSBs and SIBs, similar to the broadcast signaling of a normal physical cell. The SSB signal may include PSSs, SSSs, MIB, SIB1, other SIBs, any combination thereof, and so forth. Additionally, the broadcast signaling received by the UEs from virtual cell 201 may include information such as the cell identifiers of physical cells 205. Additionally, the cell identifier information may include a physical cell identity (PCI) and new radio cell global identifier (NR-CGI). In some examples, from the UE perspective, virtual cell 210 may support uplink and downlink channels similar to a normal physical cell. Virtual cell 210 may support channels including, but not limited to, downlink channels physical downlink control channel (PDCCH), physical downlink shared channel (PDSCH) which may be employed for paging, SIB1 transmission and random access processes, and also uplink channels including, but not limited to physical random access channel (PRACH), physical uplink shared channel (PUSCH), and physical uplink control channel (PUCCH). Supporting UEs are discussed in further detail herein.

In some examples, virtual cell 210 may communicate an indication that transmissions from virtual cell 210 may be limited to either broadcast only or selective unicast and virtual cell 210 may receive acknowledgement of the indication from a UE. In this example, the UE may have support for virtual cell connections and may be referred to herein as a supporting UE.

In FIG. 2, supporting UEs may only receive information from virtual cell 210 due to the broadcast only nature of some types of virtual cells. Virtual cells may be various cell types such as, but not limited to, broadcast only, selective unicast, and a cell type that may also be configured to be UE specific by dedicated RRC signaling. In the example that virtual cell 210 is a broadcast only cell type, virtual cell 210 may be employed only for UE camping and for UEs receiving broadcast transmissions from virtual cell 210. In the example that virtual cell 210 is a selective unicast cell type, the UE may be capable of connecting to physical cells 205 of virtual cell 210 if the UE is configured to be CoMP capable. Additionally, from the perspective of the supporting UEs, virtual cell 210 may have special access control.

In some examples, a UE may camp in virtual cell 210 and may be in an idle mode (e.g., RRC_IDLE) or an inactive mode (e.g., RRC_INACTIVE). Because virtual cell 210 may not support unicast connections or may support only limited capacity unicast, the virtual cell may broadcast the MIB and/or SIBs of its physical cells so that the UE may fast switch to the appropriate physical cell. Once the UE wakes up or the UE is ready to connect to a physical cell 205, the UE may be in an RRC connect setup or resume procedure. During the RRC connect setup or resume procedure a non-supporting UE may be directed to a normal physical cell 205 in the same coverage area of virtual cell 210 by handover or redirection. Additionally, a supporting UE which may receive the broadcast only SIB may reselect a normal physical cell 205 in the coverage area of the virtual cell 210 or may initiate a random access procedure and may then be directed to a physical cell by the network or virtual cell 210. The redirection, reselection, random access, and handover procedures are discussed in further detail herein.

In FIG. 2, UEs may camp in virtual cell 210 to save power. By camping with virtual cell 210, the UE may not have to reselect multiple cells and as a result, may not have to perform the measurements associated with selecting a different cell with which to communicate. In some examples, the UEs may be in an idle mode or inactive mode, thus when the UE wakes up, the UE may communicate with the cell with which it is camped as opposed to reselecting a new cell for connection. This may result in reduced latency when acquiring a signal which may have a low signal to noise ratio (SNR), which in turn, may be a result of the SFN gain of virtual cell 210.

In some examples, UEs may camp in virtual cell 210 due to the higher paging efficiency and increased broadcast efficiency. In FIG. 2, physical cells 205 may reserve the same time and/or frequency resource blocks, thus resulting in little to no inter-cell interference. Alternatively, in other non-virtual cell systems, paging may be broadcasted by each cell of the paging area respectively. Because the cells may not be coordinated and may employ different scrambling, this may lead to undesirable inter-cell interference and reduced broadcast efficiencies.

In some examples, virtual cell 210 may be configured as downlink only. The UEs may be camped in virtual cell 210 and operate in an RRC_IDLE or RRC_INACTIVE UE mode. In this example, because the UE is camped in virtual cell 210, when the UE wakes up or resumes an active mode, the UEs may be redirected to a normal physical cell 205 in RRC connection establishment or resume mode.

Figure 3:
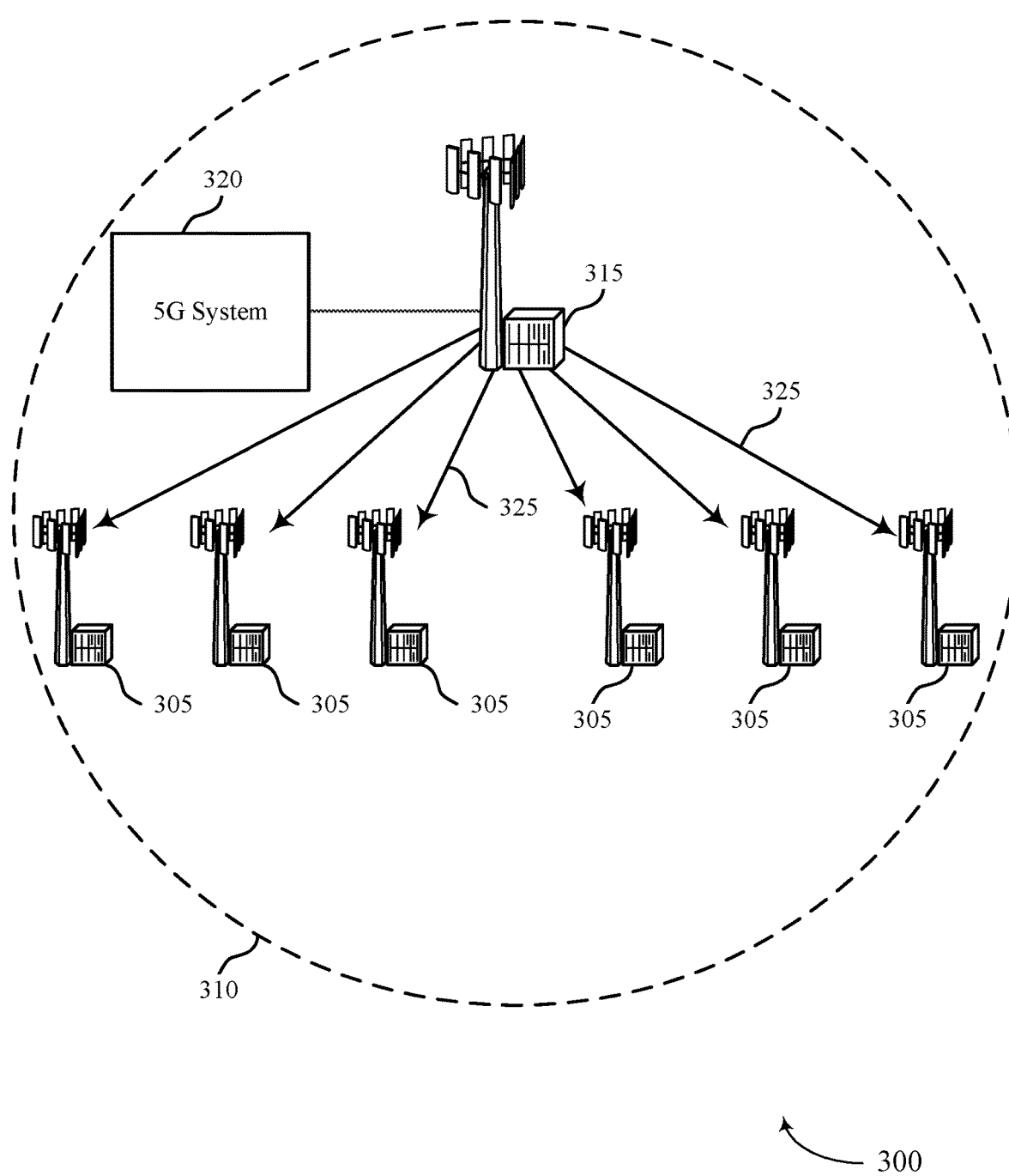
FIG. 3 illustrates an example of a wireless communications system that supports UE camping in a virtual cell in accordance with aspects of the present disclosure.

FIG. 3 illustrates an example of a wireless communications system 300 that supports UE camping in a virtual cell in accordance with aspects of the present disclosure. In some examples, wireless communications system 300 may implement aspects of wireless communication systems 100 and 200. In the example of FIG. 3, the wireless communication system 300 may include base stations which may be examples of a base station 105 of FIG. 1.

One physical implementation option of a virtual cell 310 is illustrated in FIG. 3, but there may be various physical implementations of virtual cell 310. One physical implementation option may include a central unit (CU) 315 coordinating with multiple distributed units (DUs) 305 to form virtual cell 310. CU 315 may also be coupled to and in communication with a 5G system 320 as illustrated in FIG. 3. Another example physical implementation option may include DUs 305 coordinating amongst themselves to form virtual cell 310, and yet another example may include a low-layer split CU (lls-CU) coordinating 11s-DUs to form virtual cell 310. In some examples, CU 315 may be a logical node that includes functions such as transfer of user data, mobility control, radio access network sharing, session management, and any function that is not allocated specifically and exclusively to DUs 305. CU 315 may control the operation of DUs 305 over a front-haul interface. In some examples, a DU 305 may be a logical node that includes a subset of gNodeB functions, which may depend on the functional splits. In some examples, the operation of a DU 305 may be controlled by CU 315.

The physical implementation in which CU 315 coordinates DUs 305 to form virtual cell 310 may be referred to herein as intra-CU coordination. In some examples of intra-CU coordination, and as illustrated in FIG. 3, a virtual cell 310 may include a CU 315 and one or more DUs 305 and virtual cell 310 may be supported by CU 315 and the one or more DUs 305. The coverage area of virtual cell 310 may include the corresponding coverage areas of each of the physical cells associated with DUs 305. In the intra-CU coordination physical implementation, CU 315 may coordinate the broadcast signaling of the physical cells associated with DUs 305. As illustrated in FIG. 3, CU 315 may communicate with each DU 305 via communications links 325, and may coordinate the signaling and additionally the use of time and frequency resource blocks used by DUs 305. By coordinating the signaling of DUs 305, CU 315 may be able to schedule DU 305 transmissions to minimize interference and to increase broadcasting and paging efficiencies.

Another physical implementation of intra-CU coordination may be referred to as virtual CU-DU virtual cell implementation. In some examples of the virtual CU-DU virtual cell implementation, the virtual cell may include a CU and DU, but the CU and DU may not be split into two different types of logical nodes. In some examples, the virtual cell may be supported by one or more lower-layer split DUs associated with a single lower-layer split DU. In one example, a first gNodeB may perform the functions of a CU, thus the first gNodeB may act as a virtual CU, and the other remaining gNodeBs may perform the functions of DUs and thus act as virtual DUs. In this example, an F1 interface may be supported between the virtual CU and the virtual DU. Generally, the F1 interface may provide for the interconnection of a gNodeB-CU and a gNodeB-DU of a gNodeB within an NG-RAN, or may provide for the interconnection of a gNodeB-CU and a gNodeB-DU of an en-gNodeB within an E-UTRAN. In some examples of the virtual CU-DU virtual cell implementation, an actual CU may connect and communicate with the gNodeBs via F1 signaling. In some examples, F1 Application Protocol (F1AP) signaling may be similar to M2 (e.g., MCE-eNB interface in eMBS) for resource reservation on each member DU, for virtual cell configurations and for broadcast signaling.

Another virtual cell implementation may be referred to as intra-DU coordination. In some examples of intra-DU coordination, each individual DU may have multiple cells. The multiple cells of the DUs may reserve and use the same time resource blocks and the same frequency resource blocks, and the intra-frequency cells of the DU may form a virtual cell. In some examples, the intra-DU coordination implementation may support CoMP. Further, the connection and communication between the DUs may not employ F1 and/or F1AP signaling.

Figure 4:
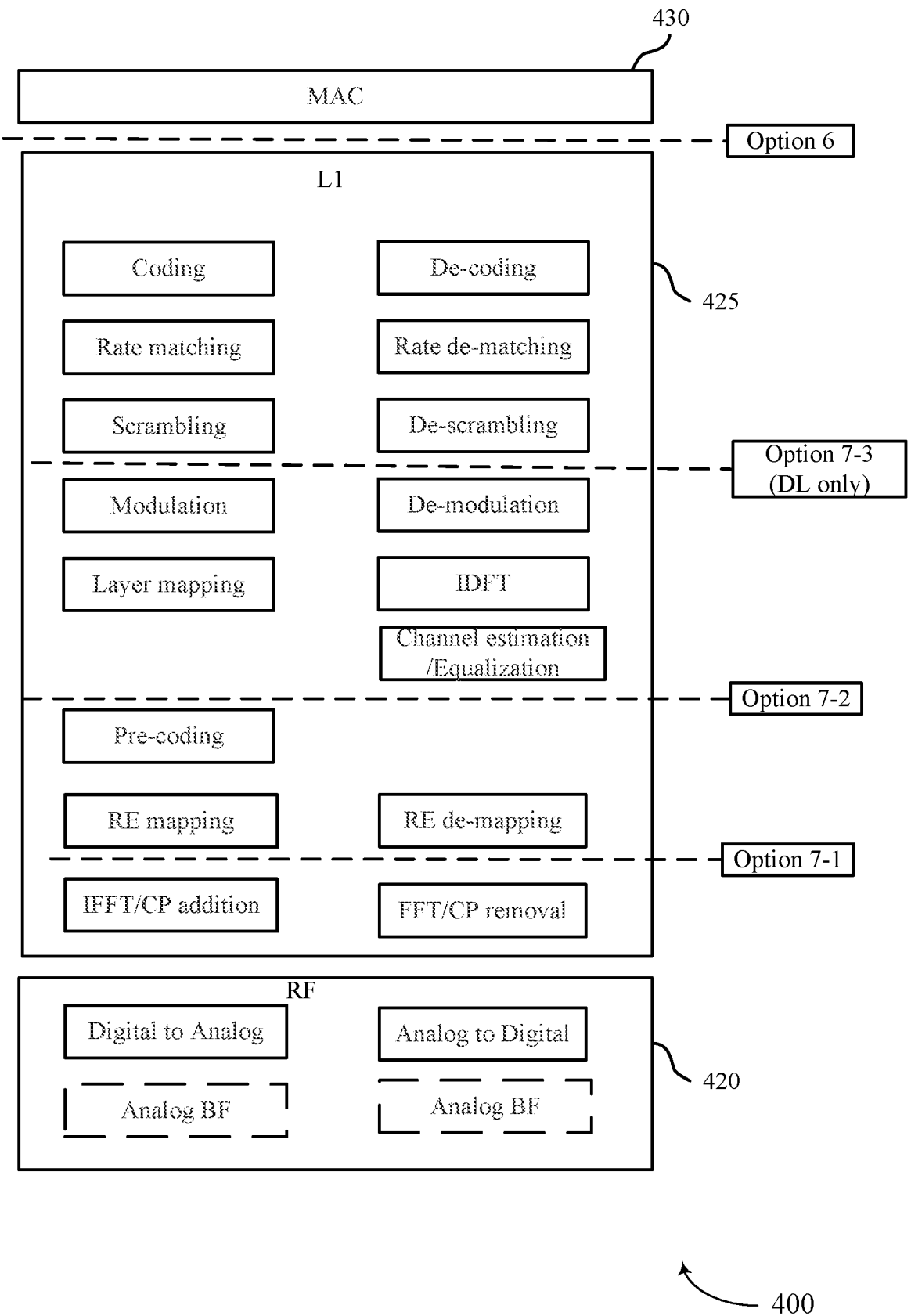
FIG. 4 illustrates an example of wireless communications signaling that supports UE camping in a virtual cell in accordance with aspects of the present disclosure.

FIG. 4 illustrates an example of a wireless communications signaling 400 that supports UE camping in a virtual cell in accordance with aspects of the present disclosure. In some examples, wireless communications system 400 may implement aspects of wireless communication systems 100, 200, and 300. In the example of FIG. 4, the wireless communications signaling 400 may include the signaling between a CU and DUs, as associated with a base station, as exemplified by the base station 105 of FIG. 1.

FIG. 4 illustrates another virtual cell implementation, referred to as intra lls-CU, in which additional splits in the layers may be introduced. As previously discussed, F1 and F1AP signaling may be employed for communication between a CU and the corresponding DUs, and the F1 signaling may be a defined high layer split. In the intra-lls-CU virtual cell implementation, low layer splits may be additionally defined as options. Further, in the intra-lls-CU virtual cell implementation, the virtual cell may be formed by 11s-DUs of a lls-CU.

FIG. 4 illustrates four alternative low layer split options: split options 6, 7-3, 7-2, and 7-1. In FIG. 4, split options 6, 7-3, 7-2, and 7-1 are illustrated amongst three layers: an RF layer 420, an L1 layer 425, and a MAC layer 430. Split option 6 illustrates a split between MAC layer 430 and L1 layer 425. In split option 6, MAC layer 430 and other upper layers may be supported by the CU while L1 layer 425 and RF layer 420 may be supported by the one or more DUs.

Further, an interface between the CU and DUs may carry configuration and scheduling-related information (e.g. MCS, Layer Mapping, Beamforming, Antenna Configuration, resource block allocation, and so forth) as well as data and measurements.

Split option 7 may include multiple split configurations which may be asymmetric and may include an intra-PHY (or L1) layer split. Split option 7-1 in the uplink may include Fast Fourier Transform (FFT), cyclic prefix (CP) removal and in some cases PRACH filtering functions residing in the DU, while the rest of the PHY or L1 functions may reside in the CU. In the downlink, split option 7-1 may include Inverse Fast Fourier Transform (IFFT) and CP addition functions residing in the DU, and the rest of the PHY or L1 functions residing in the CU. In split option 7-2 for the uplink, FFT, CP removal, resource de-mapping and possibly pre-filtering functions may reside in the DU, and the rest of the PHY or L1 functions may reside in the CU. In split option 7-2 for the downlink, iFFT, CP addition, resource mapping and precoding functions may reside in the DU, while the rest of the PHY or L1 functions reside in the CU. In some examples, split option 7-3 may be downlink only. In split option 7-3, the encoder may reside in the CU and the rest of the PHY or L1 functions may reside in the DU.

Figure 5:
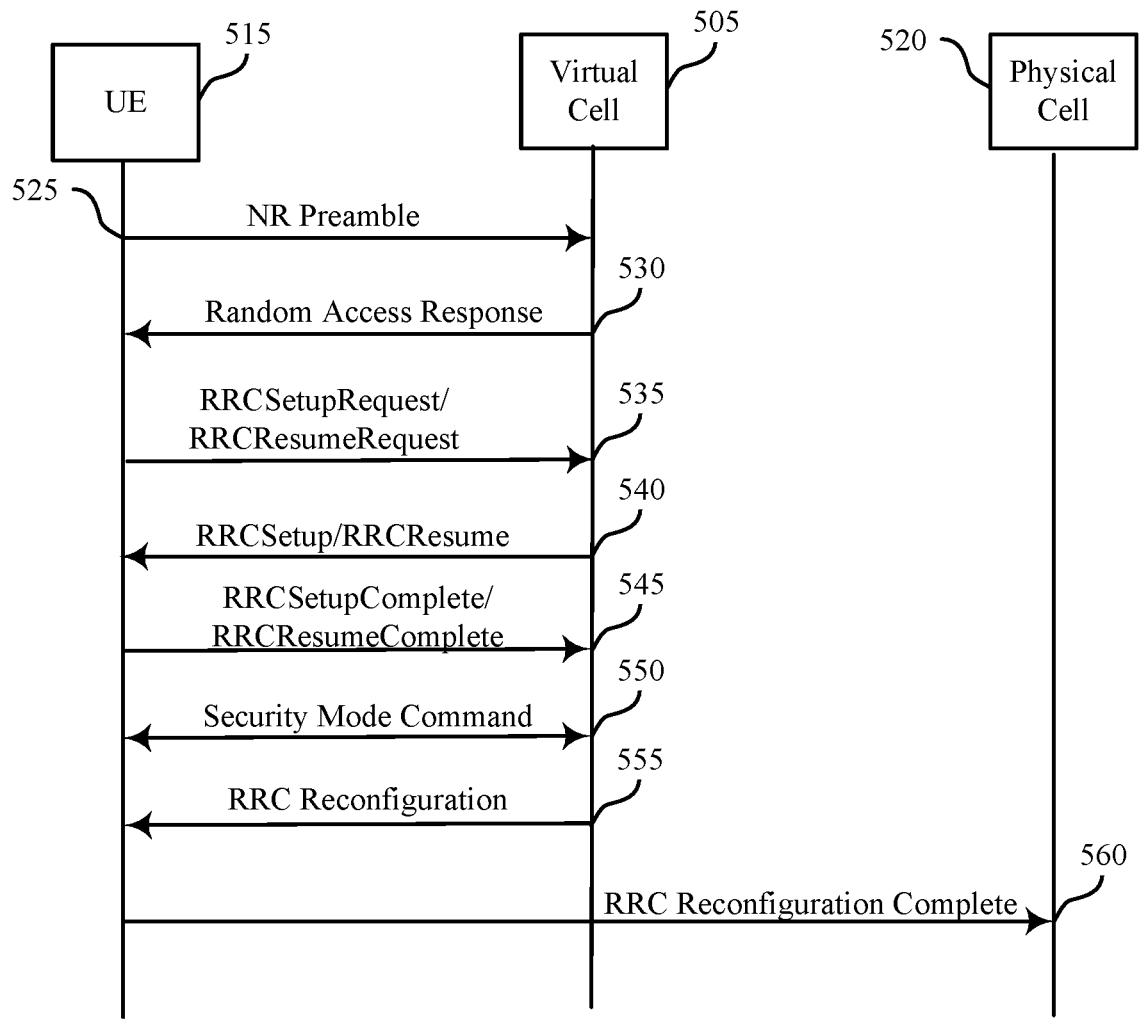
FIG. 5 illustrates an example of a process flow that supports UE camping in a virtual cell in accordance with aspects of the present disclosure.

FIG. 5 illustrates an example of a process flow 500 that supports UE camping in a virtual cell in accordance with aspects of the present disclosure. In some examples, process flow 500 may implement aspects of wireless communication systems 100, 200, and 300. In the example of FIG. 5, process flow 500 may include a virtual cell 505 and a physical cell 520, in which physical cell 520 may be associated with, for example, a base station 105 of FIG. 1. Process flow 500 may also include a UE 515, which may be an example of UE 115 of FIG. 1. Process flow 500 may direct UE 515 from virtual cell 505 to physical cell 520 in a handover procedure.

In FIG. 5, UE 515 may transmit an NR preamble to virtual cell 505 at 525, and virtual cell 505 may receive the NR preamble. At 525, UE 515 may wakeup or be ready to connect to a physical cell. UE 515 may setup or resume connection using a random access procedure (e.g., RACH) at virtual cell 505. At 530, virtual cell 505 may transmit the random access response to UE 515. At 530, by measuring the random access message received at 525, virtual cell 505 may select physical cell 520 for UE 515. At 530, the random access response message may carry a timing advance (TA) and uplink resource grant for physical cell 520.

From 535 to 545, depending on whether UE 515 is in an inactive mode or an idle mode, UE 515 and virtual cell 505 may communicate RRC setup or RRC resume messaging depending on the implementation. The RRC protocol may be processed by virtual cell 505 until the RRC reconfiguration is transmitted at 560, and UE 515 is handed over to physical cell 520. The low layers may be carried by physical cell 520, but may use the virtual cell scrambling and demodulation reference signal (DMRS) signaling.

At 535, depending on whether UE 515 is in an inactive mode or an idle mode, UE 515 may transmit either an RRC Setup Request when in an inactive mode or transmit an RRC Resume Request when in an idle mode to virtual cell 505. At 535, virtual cell 505 may receive the RRC Setup Request or the RRC Resume Request transmitted by UE 515. At 540, virtual cell 505 may transmit to UE 515, depending on whether UE 515 is in an inactive mode or an idle mode, either an RRC Setup Message or an RRC Resume message, respectively. UE 515 may receive the RRC Setup Message or an RRC Resume message from virtual cell 505. At 545, depending on whether UE 515 is in an inactive mode or an idle mode, UE 515 may transmit either an RRC Setup Complete message when in an inactive mode or transmit an RRC Resume Complete message when in an idle mode to virtual cell 505. Virtual cell 505 may receive the RRC Setup Complete or RRC Resume Complete message from UE 515.

At 550, the security mode command messaging may be communicated between UE 515 and virtual cell 505 and at 555, virtual cell 505 may transmit the RRC Reconfiguration to UE 515 and UE 515 may receive the RRC Reconfiguration messaging from virtual cell 505. The RRC Reconfiguration messaging may include the mobility information for physical cell 520. At 560, UE 515 may transmit the RRC Reconfiguration Complete messaging to physical cell 520 and the handover of UE 515 to physical cell 520 may be complete. After UE 515 has been handed over to physical cell 520, both the low layers and the RRC signaling may be carried or communicated over physical cell 520. In some examples, communications between transmission of the random access message and transmission of the RRC reconfiguration message by virtual cell 505 may be split such that RRC-layer communications are via virtual cell 505, but lower-than-RRC-layer communications may be via a physical cell.

Figure 6:
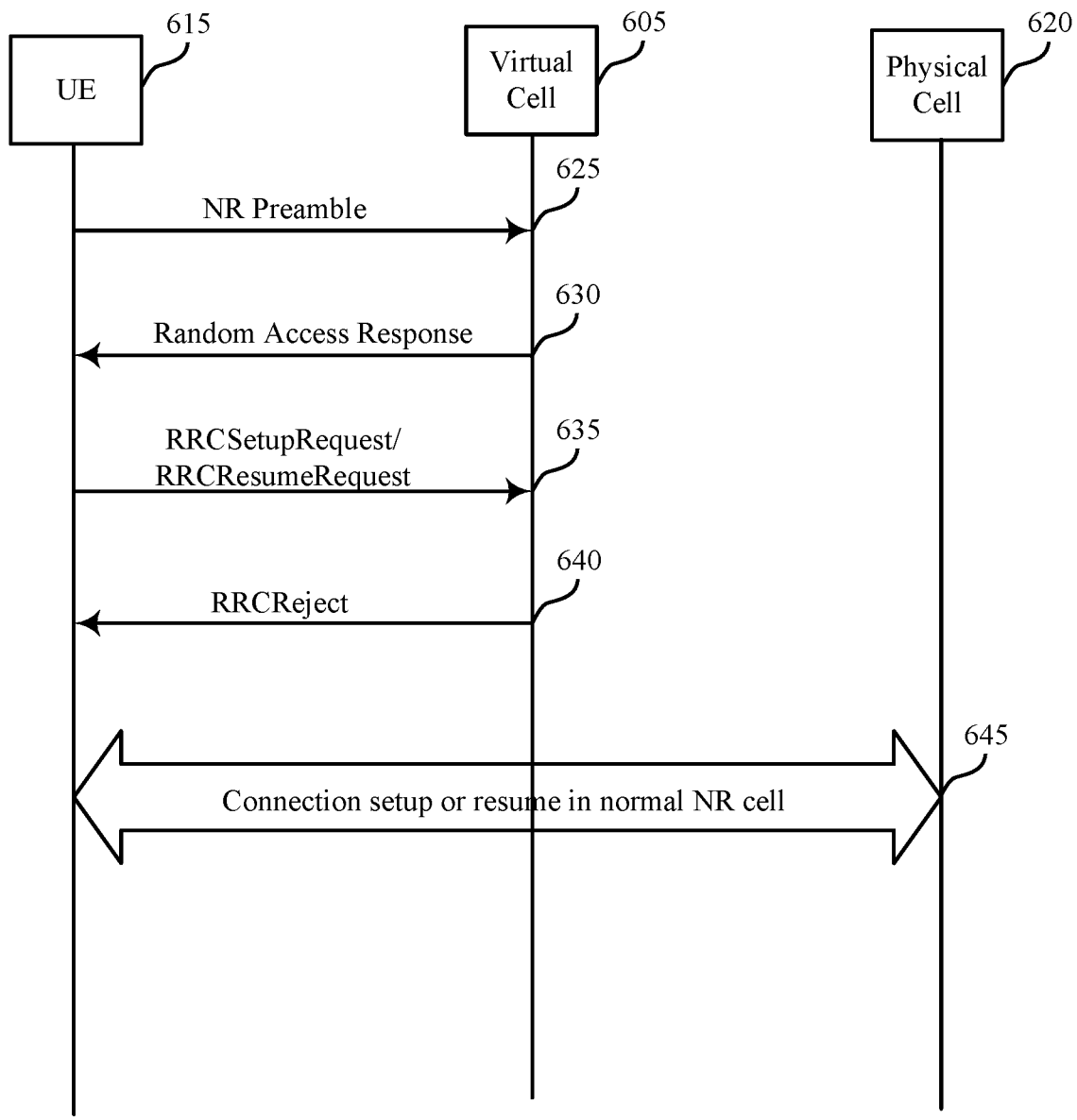
FIG. 6 illustrates an example of a process flow that supports UE camping in a virtual cell in accordance with aspects of the present disclosure.

FIG. 6 illustrates an example of a process flow 600 that supports UE camping in a virtual cell in accordance with aspects of the present disclosure. In some examples, process flow 600 may implement aspects of wireless communication systems 100, 200, and 300. In the example of FIG. 6, process flow 600 may include a virtual cell 605 and a physical cell 620, in which physical cell 620 may be associated with, for example, a base station 105 of FIG. 1. Process flow 600 may also include a UE 615, which may be an example of UE 115 of FIG. 1. Process flow 600 may direct UE 615 from virtual cell 605 to physical cell 620 in a handover procedure.

In FIG. 6, UE 615 may transmit an NR preamble to virtual cell 605 at 625, and virtual cell 605 may receive the NR preamble. At 625, UE 615 may wakeup or be ready to connect to a physical cell. UE 615 may setup or resume connection using a random access procedure (e.g., RACH) at virtual cell 605. At 630, virtual cell 605 may transmit the random access response. At 630, by measuring the random access message received at 625, virtual cell 605 may select physical cell 620 for UE 615. At 630, the random access response message may carry a timing advance (TA) and uplink resource grant for physical cell 620. Additionally, the random access response from virtual cell 605 may include normal physical cell resource information.

Similar to FIG. 5, in FIG. 6, at 635, depending on whether UE 615 is in an inactive mode or an idle mode, UE 615 and virtual cell 605 may communicate RRC setup messaging or RRC resume messaging depending on the implementation. At 635, depending on whether UE 615 is in an inactive mode or an idle mode, UE 615 may transmit either an RRC Setup Request message when in an inactive mode or transmit an RRC Resume Request message when in an idle mode to virtual cell 605. At 635, virtual cell 605 may receive the RRC Setup Request or the RRC Resume Request messaging transmitted by UE 615.

At 640, virtual cell 605 may transmit RRC Reject messaging to UE 615 and UE 615 may receive the RRC Reject messaging from virtual cell 605. Further at 640, UE 615 may be redirected to physical cell 620 and the messaging may include redirected carrier information for physical cell 620. At 645, depending on whether UE 615 may be in an inactive mode or an idle mode, UE 615 and physical cell 620 may continue with the connection setup or resume, respectively, for a normal physical cell.

Figure 7:
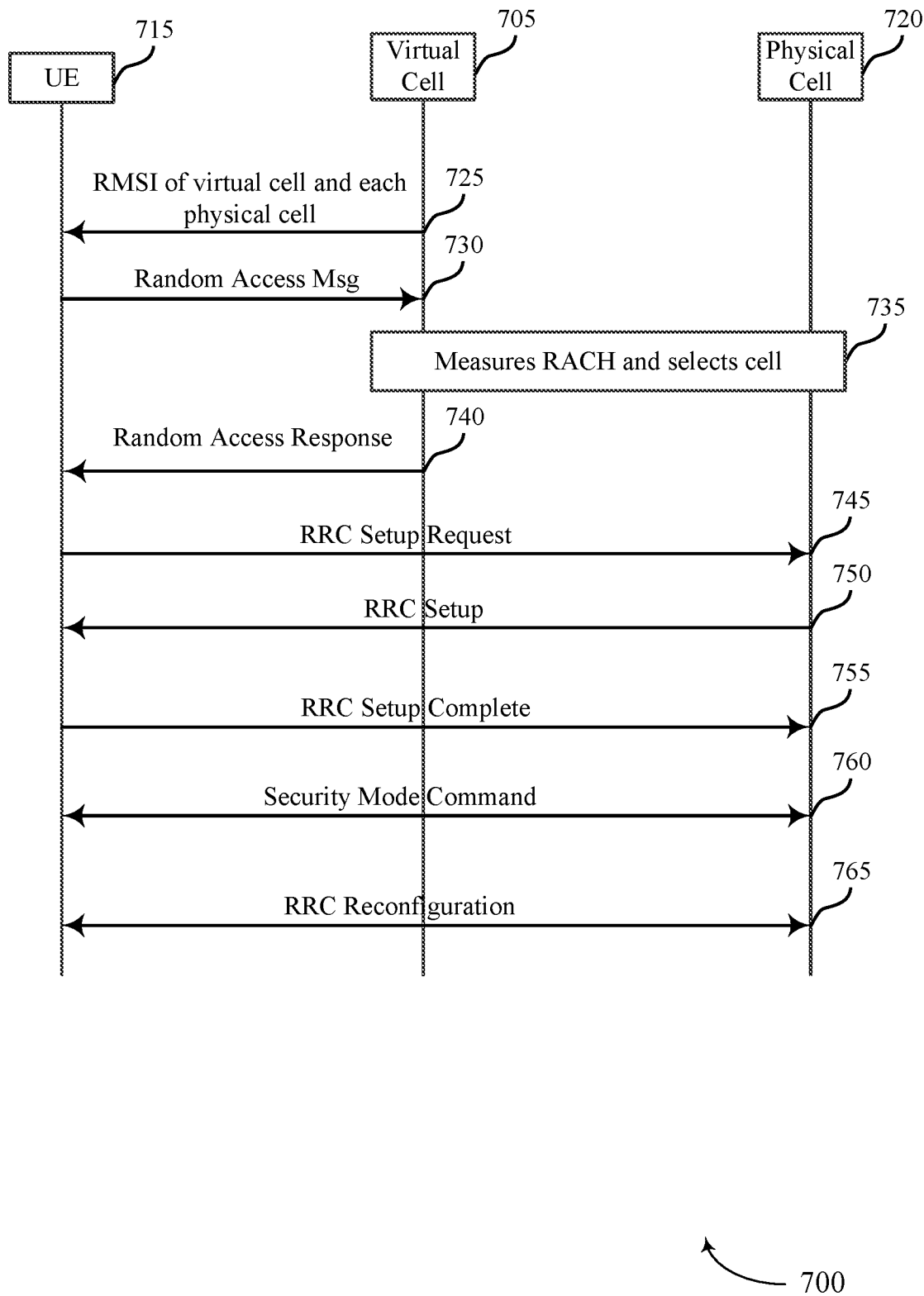
FIG. 7 illustrates an example of a process flow that supports UE camping in a virtual cell in accordance with aspects of the present disclosure.

FIG. 7 illustrates an example of a process flow 700 that supports UE camping in a virtual cell in accordance with aspects of the present disclosure. In some examples, process flow 700 may implement aspects of wireless communication systems 100, 200, and 300. In the example of FIG. 7, process flow 700 may include a virtual cell 705 and a physical cell 720, in which the physical cell 720 may be associated with, for example, a base station 105 of FIG. 1. Process flow 700 may also include a UE 715, which may be an example of UE 115 of FIG. 1. Process flow 700 may direct UE 715 from virtual cell 705 to physical cell 720 in a redirect procedure that uses information included in the random access response. In FIG. 7, before the random access request messaging is transmitted from UE 715 to virtual cell 705, UE 715 may receive MIB and/or SIB signaling of both virtual cell 705 and one or more physical cells 720 of virtual cell 705.

In FIG. 7 and at 725, the remaining minimum system information (RMSI) messaging may be transmitted from virtual cell 705 to UE 715, and UE 715 may receive the RMSI messaging from virtual cell 705. Although the RMSI is depicted in FIG. 7 as being transmitted from virtual cell 705, the RMSI messaging may include the RMSI of both virtual cell 705 and the RMSI of each physical cell 720 in the RMSI, as virtual cell 705 may have the information for each physicals cell 720. In some examples, the RMSI message may include the MIB and the SIB of both virtual cell 705 and physical cell 720. Additionally, in some examples, virtual cell 705 may employ a PRACH partition so that virtual cell 705 may know that UE 715 is a supporting UE.

At 730, UE 715 may transmit a random access message to virtual cell 705 and the random access message may be received by virtual cell 705. At 735, by measuring the received random access message, virtual cell 705 may select physical cell 720 for UE 715. In FIG. 7, the network may decide to redirect UE 715 to physical cell 720 based on the random access message measurement.

At 740, virtual cell 705 may transmit a random access response to UE 715 and UE 715 may receive the random access response from virtual cell 705. Further at 740, the random access response message may carry the uplink grant information, the TA of physical cell 720, and the handover command for UE 715 to be handed over to physical cell 720. In the random access response message of 740, a new MAC header may be employed which will be discussed herein.

From 745 to 765, UE 715 may communicate with physical cell 720. At 745, UE 715 may transmit an RRC Setup Request message to physical cell 720 and physical cell 720 may receive the RRC Setup Request message from UE 715. Physical cell 720 may then respond and transmit, at 750, the RRC Setup message to UE 715, and the RRC Setup message may be received by UE 715.

At 755, UE 715 may communicate the RRC Setup messaging to physical cell 720 and physical cell 720 may receive the RRC Setup messaging from UE 715. At 760, the security mode command may be communicated between UE 715 and physical cell 720 and at 765, the RRC reconfiguration also may be communicated between UE 715 and physical cell 720.

Figure 8:
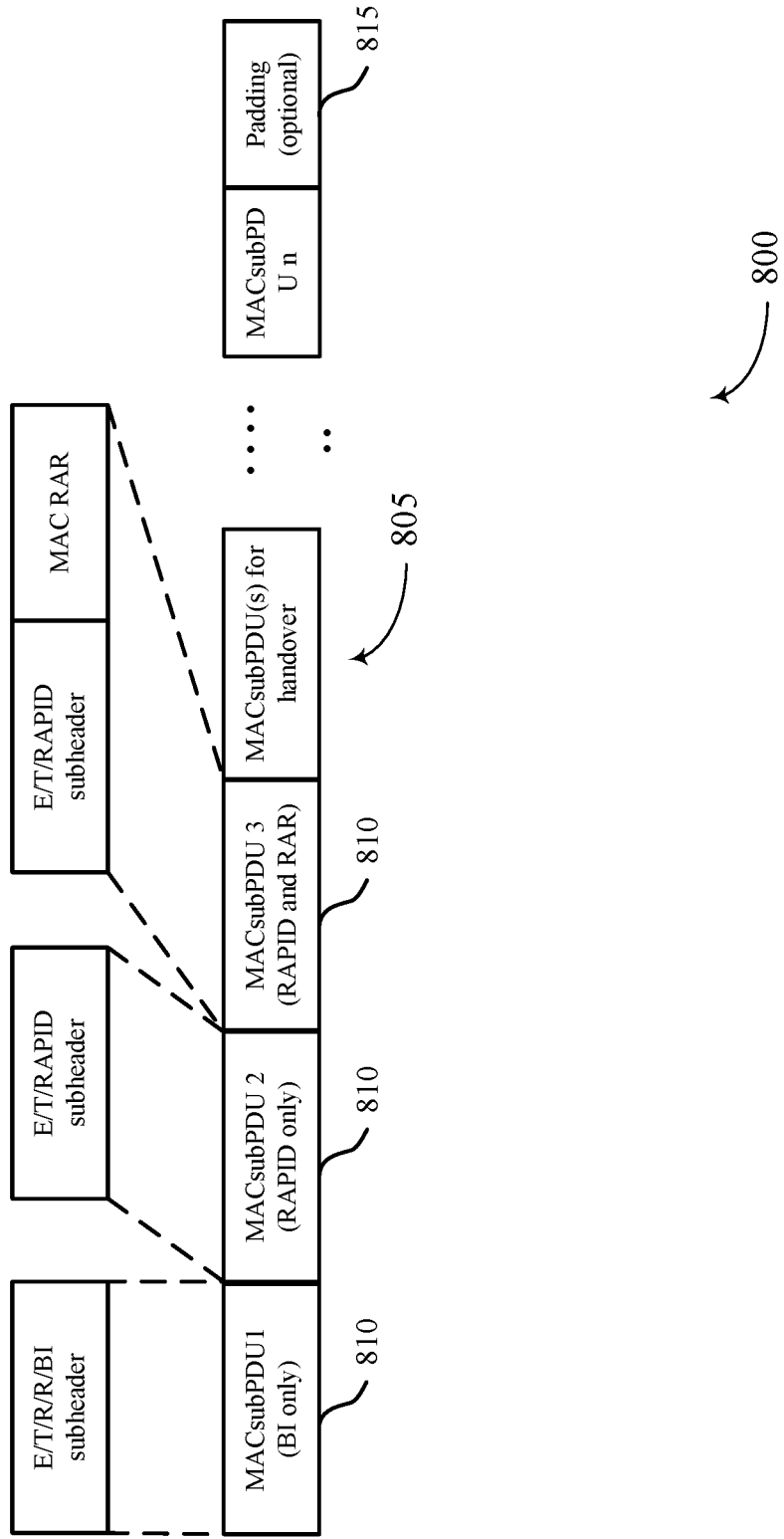
FIG. 8 illustrates an example of a control element that supports UE camping in a virtual cell in accordance with aspects of the present disclosure.

FIG. 8 illustrates an example of a control element 800 that supports UE camping in a virtual cell in accordance with aspects of the present disclosure. In some examples, control element 800 may implement aspects of wireless communication systems 100, 200, and 300. In the example of FIG. 8, control element 800 may be transmitted from a virtual cell which may be associated with, for example, a base station 105 of FIG. 1. Control element 800 may be transmitted to a UE which may be an example of UE 115 of FIG. 1. Additionally, control element 800 may be transmitted as discussed in FIG. 7 at step 740 in process flow 700. In some examples, control element 800 may be a MAC control element.

As discussed in FIG. 7, at 740, virtual cell 705 may transmit a random access response to UE 715. Further at 740, the random access response message may carry the uplink grant information, the TA of physical cell 720, and the handover command for UE 715 to be handed over to physical cell 720. In the random access response message of 740, control element 800 may be employed.

Control element 800 may be appended after the random access response message as MACsubPDU for handover as illustrated by element 805 of FIG. 8. In some examples, a MAC PDU header may include one or more MAC PDU subheaders, where each subheader may correspond to a random access response. In some examples, the MAC subheader 810 may include three header fields E/T/RAPID and padding 815 may occur after the last MAC random access response as illustrated in FIG. 8.

The UE may receive in the random access response message, the MAC CE which may be appended after the random access response as MACsubPDU(s) for handover with random access preamble identifier (RAPID), target cell index, bandwidth part (BWP), and so forth, and any combination thereof.

Figure 9:
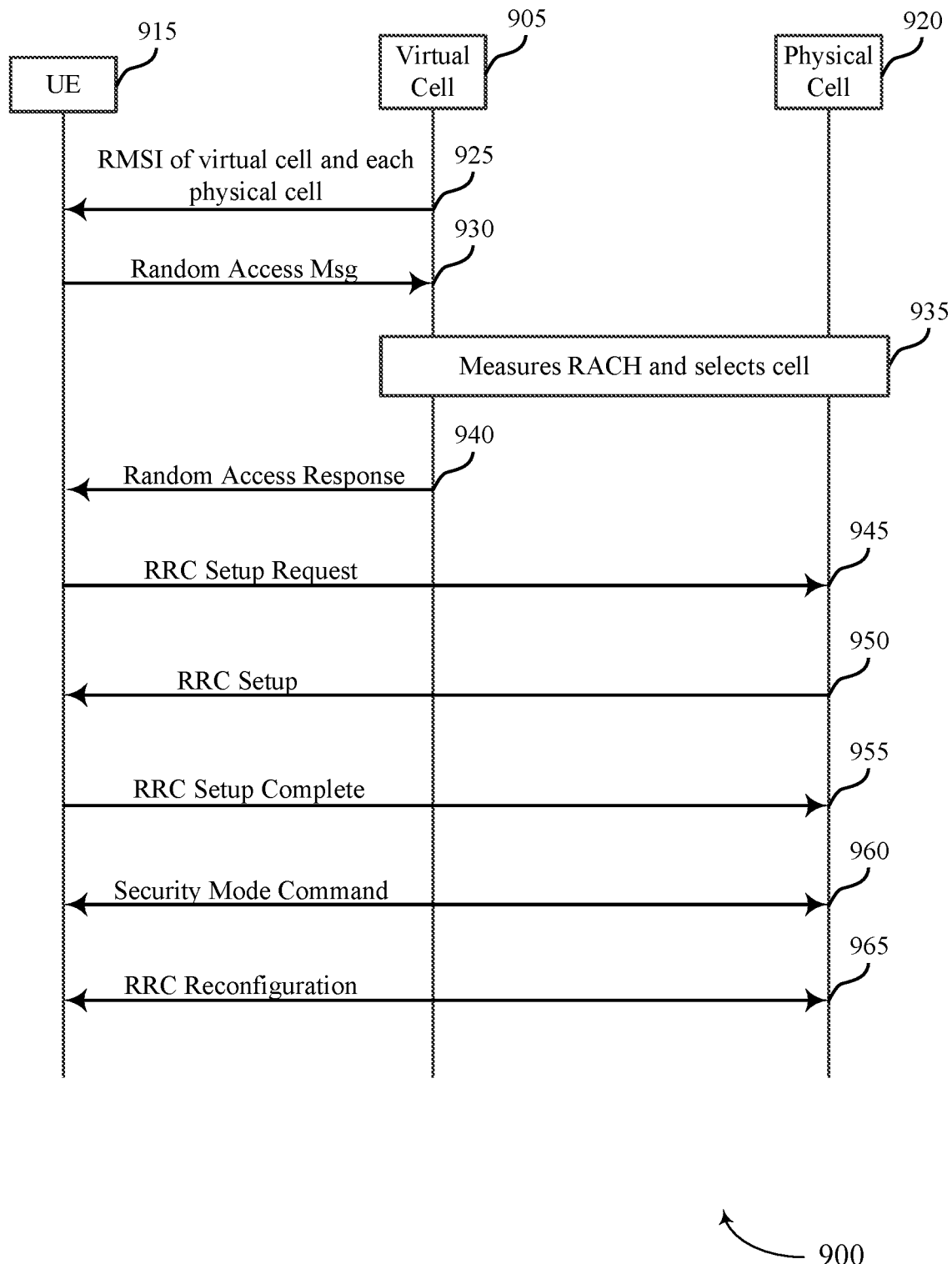
FIG. 9 illustrates an example of a process flow that supports UE camping in a virtual cell in accordance with aspects of the present disclosure.

FIG. 9 illustrates an example of a process flow 900 that supports UE camping in a virtual cell in accordance with aspects of the present disclosure. In some examples, process flow 900 may implement aspects of wireless communication systems 100, 200, and 300. In the example of FIG. 9, process flow 900 may include a virtual cell 905 and a physical cell 920, in which physical cell 920 may be associated with, for example, a base station 105 of FIG. 1. Process flow 900 may also include a UE 915, which may be an example of UE 115 of FIG. 1. Process flow 900 may direct UE 915 from a virtual cell 905 to physical cell 920 in a handover procedure that uses information included in the RRC setup messaging between UE 915 and physical cell 920. The RRC setup message may include handover information for lower-than-RRC-layer communications by UE 915 with physical cell 920. Process flow 900 may be similar to the process flow 700 of FIG. 7, with the exception that the handover command may be communicated in the RRC setup messaging between UE 915 and physical cell 920.

In FIG. 9 and at 925, the RMSI messaging may be transmitted from virtual cell 905 to UE 915, and UE 915 may receive the RMSI messaging from virtual cell 905. Although the RMSI is depicted in FIG. 9 as being transmitted from virtual cell 905, the RMSI messaging may include the RMSI of both virtual cell 905 and the RMSI of each of the physical cells in the RMSI, as virtual cell 905 may have the information for each of the physical cells. In some examples, the RMSI message may include the MIB and the SIB of both virtual cell 905 and physical cell 920.

At 930, UE 915 may transmit a random access message to virtual cell 905 and the random access message may be received by virtual cell 905. At 935, by measuring the received random access message, virtual cell 905 may select physical cell 920 for UE 915.

At 940, virtual cell 905 may transmit a random access response to UE 915 and UE 915 may receive the random access response from virtual cell 905. Further at 940, the random access response message may carry the uplink grant information and a TA of physical cell 920. In some examples, the random access response messaging may be transmitted by physical cell 920 only, using the scrambling and DMRS signaling of virtual cell 920.

From 945 to 965, UE 915 may communicate with physical cell 920. At 945, UE 915 may transmit an RRC Setup Request message to physical cell 920 and physical cell 920 may receive the RRC Setup Request message from UE 915. At 945, the message may be received by physical cell 920 low layer and may be forwarded to a virtual cell central controlling entity (e.g., CU for RRC processing). Virtual cell 905 may construct the message to be communicated at 950 and may transmit the constructed message to physical cell 920 for transmission to UE 915. Physical cell 920 may then transmit, at 950, the constructed message which may be the RRC Setup message to UE 915, and the RRC Setup message may be received by UE 915. In FIG. 9, the RRC setup messaging may include the handover command for UE 915 to be handed over to physical cell 920.

At 955, UE 915 may communicate the RRC Setup messaging to physical cell 920 and physical cell 920 may receive the RRC Setup messaging from UE 915. At 960, the security mode command may be communicated between UE 915 and physical cell 920 and at 965, the RRC reconfiguration also may be communicated between UE 915 and physical cell 920.

Figure 10:
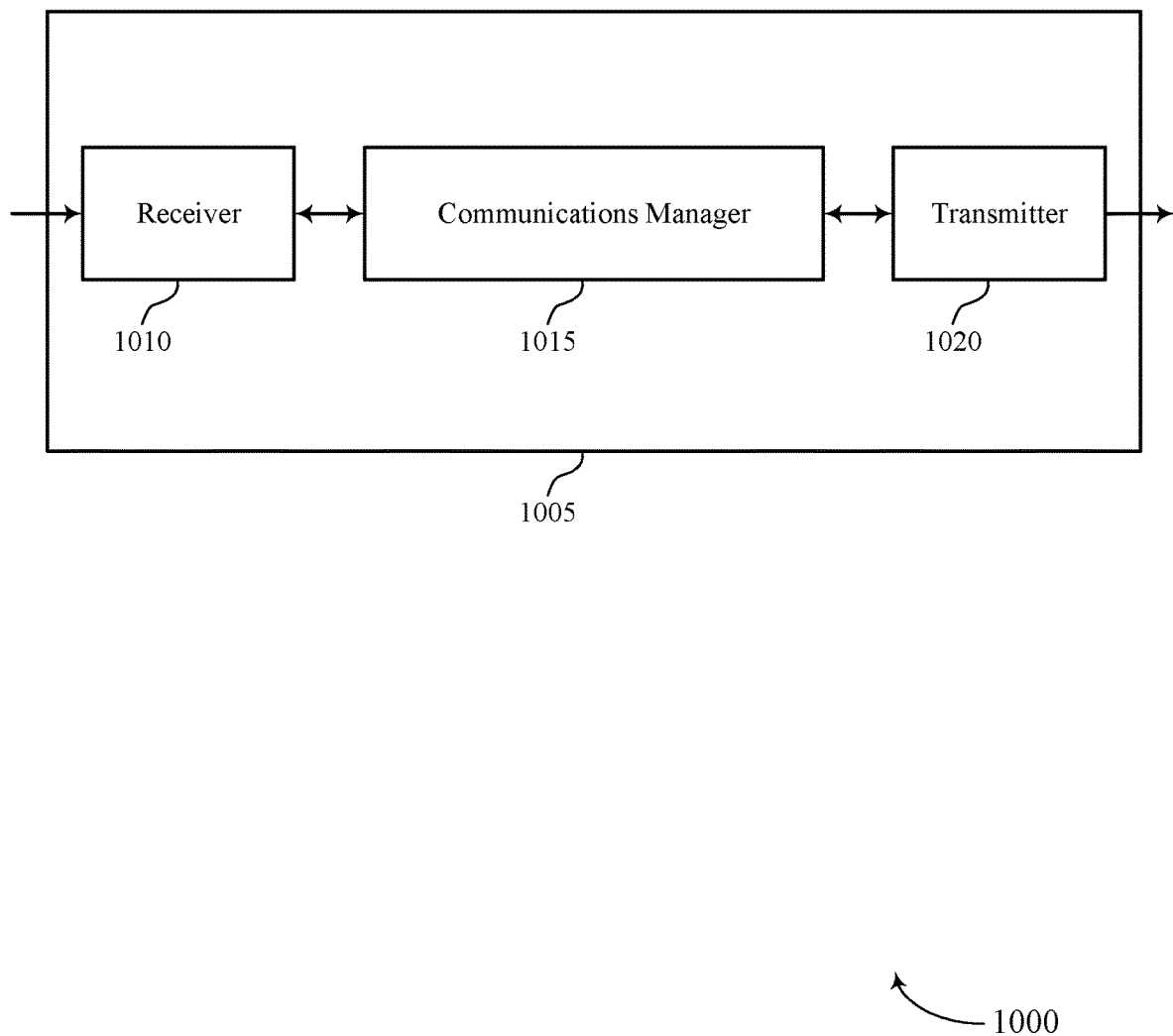
FIGS. 10 and 11 show block diagrams of devices that support UE camping in a virtual cell in accordance with aspects of the present disclosure.

FIG. 10 shows a block diagram 1000 of a device 1005 that supports UE camping in a virtual cell in accordance with aspects of the present disclosure. Device 1005 may be an example of aspects of a UE 115 as described herein. Device 1005 may include a receiver 1010, a communications manager 1015, and a transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to UE camping in a virtual cell, etc.). Information may be passed on to other components of device 1005. Receiver 1010 may be an example of aspects of transceiver 1320 described with reference to FIG. 13. Receiver 1010 may utilize a single antenna or a set of antennas.

Communications manager 1015 may identify a first cell for the UE to connect to, the first cell being a virtual cell with a coverage area that includes a set of physical cells and corresponding physical cell coverage areas. Communications manager 1015 may initiate a transition to a connected mode with the first cell via a random access procedure and connect with one of the set of physical cells during the random access procedure and based on the first cell being the virtual cell and the UE attempting to transition to the connected mode with the first cell. Communications manager 1015 may be an example of aspects of communications manager 1310 described herein.

Communications manager 1015, or its sub-components, may be implemented in hardware, code (e.g., software or firmware) executed by a processor, or any combination thereof. If implemented in code executed by a processor, the functions of communications manager 1015, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

Communications manager 1015, or its sub-components, may be physically located at various positions, including being distributed such that portions of functions are implemented at different physical locations by one or more physical components. In some examples, communications manager 1015, or its sub-components, may be a separate and distinct component in accordance with various aspects of the present disclosure. In some examples, communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1020 may transmit signals generated by other components of device 1005. In some examples, transmitter 1020 may be collocated with receiver 1010 in a transceiver module. For example, transmitter 1020 may be an example of aspects of transceiver 1320 described with reference to FIG. 13. Transmitter 1020 may utilize a single antenna or a set of antennas.

Figure 11:
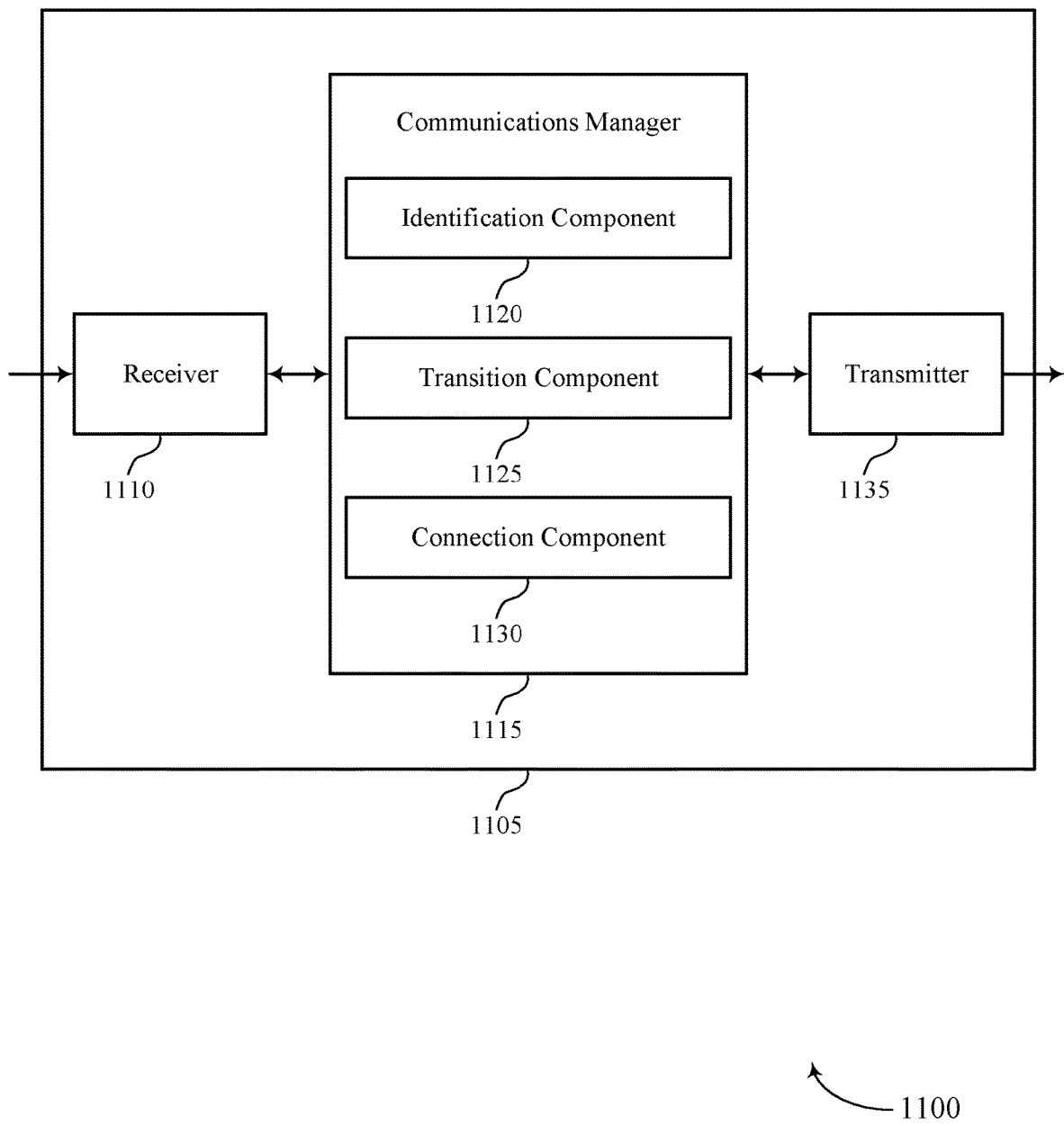

FIG. 11 shows a block diagram 1100 of a device 1105 that supports UE camping in a virtual cell in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to UE camping in a virtual cell, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an identification component 1120, a transition component 1125, and a connection component 1130. The communications manager 1115 may be an example of aspects of the communications manager 1310 described herein.

The identification component 1120 may identify a first cell for the UE to connect to, the first cell being a virtual cell with a coverage area that includes a set of physical cells and corresponding physical cell coverage areas.

The transition component 1125 may initiate a transition to a connected mode with the first cell via a random access procedure.

The connection component 1130 may connect with one of the set of physical cells during the random access procedure and based on the first cell being the virtual cell and the UE attempting to transition to the connected mode with the first cell.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
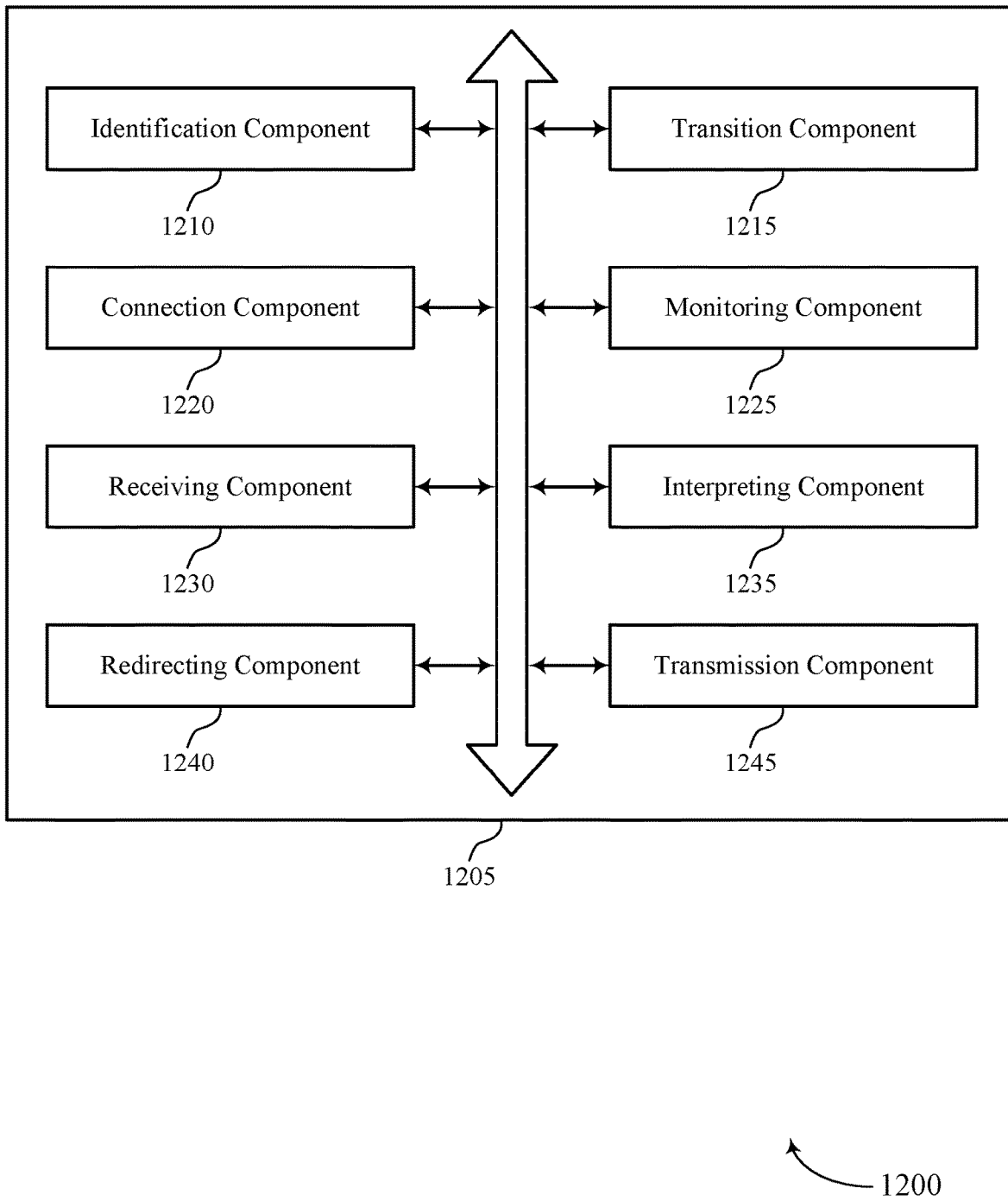
FIG. 12 shows a block diagram of a communications manager that supports UE camping in a virtual cell in accordance with aspects of the present disclosure.

FIG. 12 shows a block diagram 1200 of a communications manager 1205 that supports UE camping in a virtual cell in accordance with aspects of the present disclosure. The communications manager 1205 may be an example of aspects of a communications manager 1015, a communications manager 1115, or a communications manager 1310 described herein. The communications manager 1205 may include an identification component 1210, a transition component 1215, a connection component 1220, a monitoring component 1225, a receiving component 1230, an interpreting component 1235, a redirecting component 1240, and a transmission component 1245. Each of these modules may communicate, directly or indirectly, with one another (e.g., via one or more buses).

The identification component 1210 may identify a first cell for the UE to connect to, the first cell being a virtual cell with a coverage area that includes a set of physical cells and corresponding physical cell coverage areas. In some examples, the identification component 1210 may identify that the first cell is a virtual cell. In some examples, the identification component 1210 may identify, based on the SSB or SIB of the first cell, that transmissions from the first cell are limited to either broadcast only or selective unicast. In some examples, the identification component 1210 may identify, based on the RRC configuration, that transmissions from the first cell are UE-specific transmissions.

The transition component 1215 may initiate a transition to a connected mode with the first cell via a random access procedure. In some examples, the transition component 1215 may transition from an idle mode or from an inactive mode to the connected mode with the first cell.

The connection component 1220 may connect with one of the set of physical cells during the random access procedure and based on the first cell being the virtual cell and the UE attempting to transition to the connected mode with the first cell.

The monitoring component 1225 may monitor for at least one of a synchronization signal block (SSB) or a SIB of the first cell.

The receiving component 1230 may receive an RRC configuration.

In some examples, the receiving component 1230 may receive, from the first cell, at least one of a master information block (MIB) or a SIB of the set of physical cells of the first cell. In some examples, the receiving component 1230 may receive an indication that transmissions from the first cell are limited to either broadcast only or selective unicast. In some examples, the receiving component 1230 may receive redirection information in an RRC reject message from the first cell. In some examples, the receiving component 1230 may receive a random access response from the first cell, where the random access response includes a timing advance and an uplink resource grant for communications with the one of the set of physical cells.

In some examples, the receiving component 1230 may receive, from the first cell and via an RRC reconfiguration message, handover information to allow the UE to communicate via RRC communications with the one of the set of physical cells. In some examples, the receiving component 1230 may receive a random access response from the first cell, where the random access response includes a timing advance, an uplink resource grant for communications with the one of the set of physical cells, and handover information for the UE to communicate with the one of the set of physical cells.

In some examples, the receiving component 1230 may receive a random access response from the first cell, where the random access response includes a timing advance and an uplink resource grant for communications with the one of the set of physical cells. In some examples, the receiving component 1230 may receive, in response to the RRC setup request message, an RRC setup message that includes handover information for lower-than-RRC-layer communications by the UE with the one of the set of physical cells.

The interpreting component 1235 may fail to interpret the indication due to lack of support by the UE for virtual cell connections. In some examples, the interpreting component 1235 may interpret the indication based on the UE having support for virtual cell connections.

The redirecting component 1240 may redirect to the one of the set of physical cells in accordance with the redirection information.

The transmission component 1245 may transmit, to the one of the set of physical cells and response to the random access response, an RRC setup request.

Figure 13:
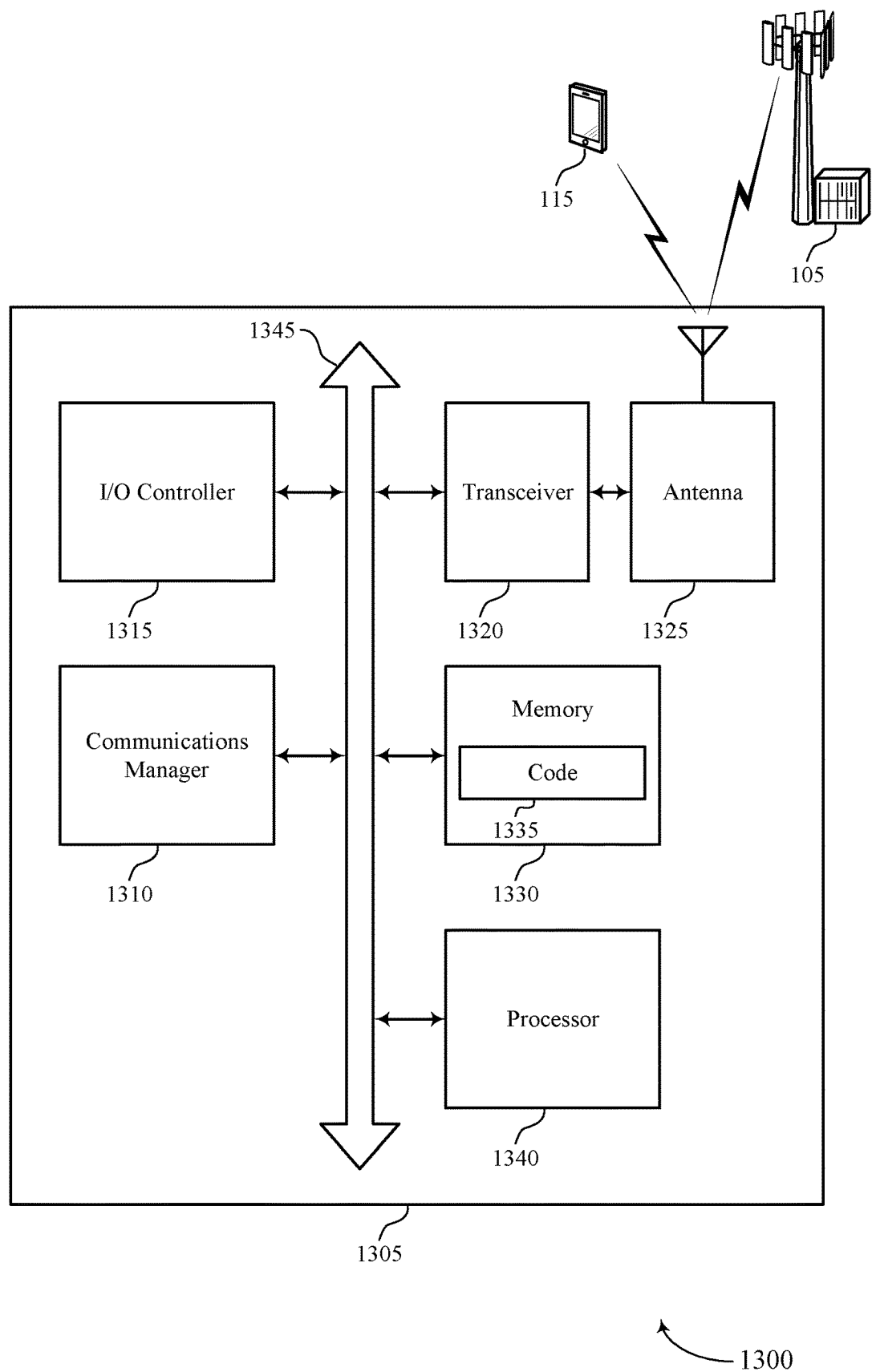
FIG. 13 shows a diagram of a system including a device that supports UE camping in a virtual cell in accordance with aspects of the present disclosure.

FIG. 13 shows a diagram of a system 1300 including a device 1305 that supports UE camping in a virtual cell in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may identify a first cell for the UE to connect to, the first cell being a virtual cell with a coverage area that includes a set of physical cells and corresponding physical cell coverage areas, initiate a transition to a connected mode with the first cell via a random access procedure, and connect with one of the set of physical cells during the random access procedure and based on the first cell being the virtual cell and the UE attempting to transition to the connected mode with the first cell.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting UE camping in a virtual cell).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
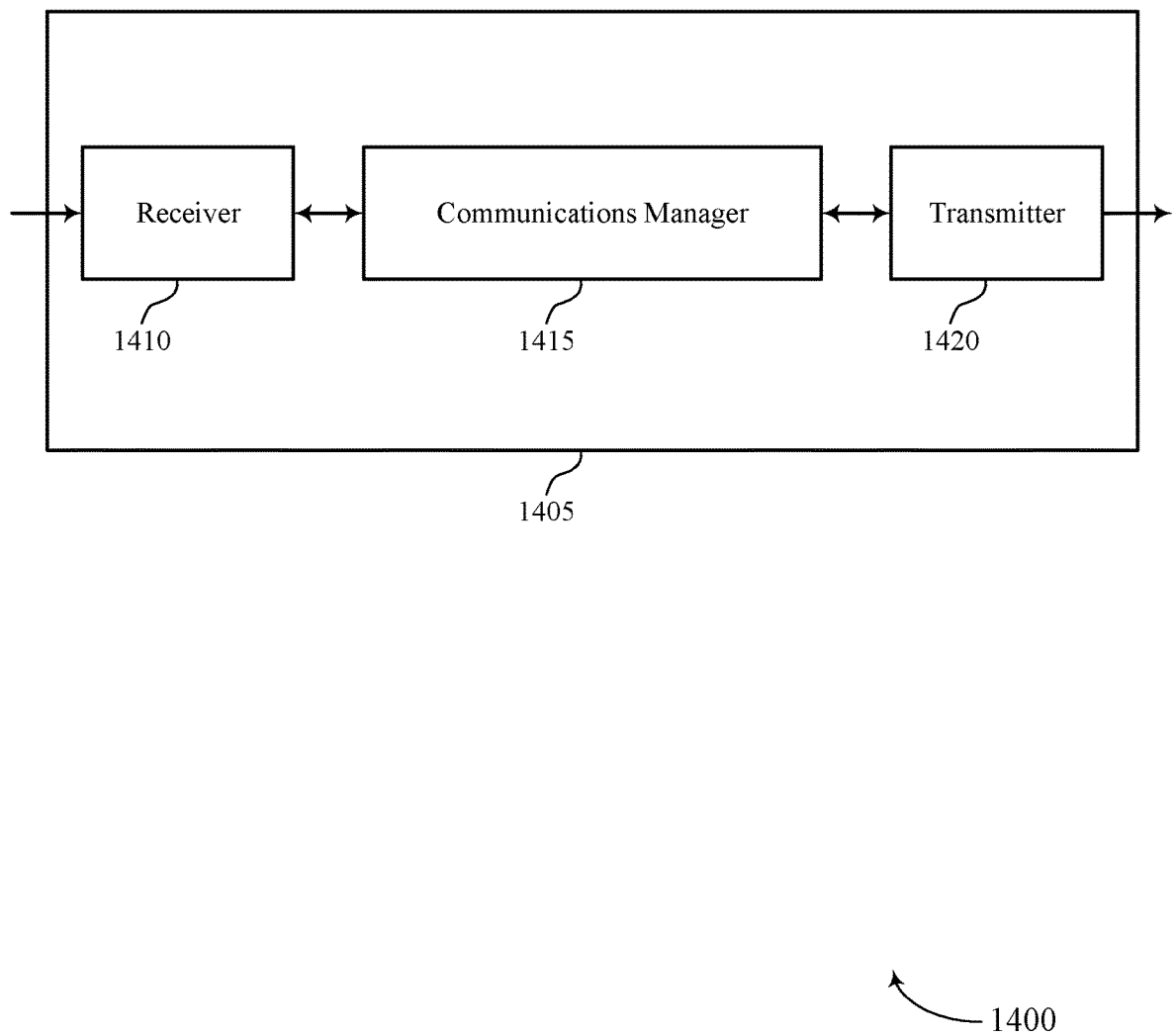
FIGS. 14 and 15 show block diagrams of devices that support UE camping in a virtual cell in accordance with aspects of the present disclosure.

FIG. 14 shows a block diagram 1400 of a device 1405 that supports UE camping in a virtual cell in accordance with aspects of the present disclosure. The device 1405 may be an example of aspects of a virtual cell as described herein. The device 1405 may include a receiver 1410, a communications manager 1415, and a transmitter 1420. The device 1405 may also include a processor. Each of these components may be in communication with one another (e.g., via one or more buses). As explained herein, the virtual cell may comprise a CU and a plurality of DUs, or simply a plurality of DUs.

The receiver 1410 may receive information such as packets, user data, or control information associated with various information channels (e.g., control channels, data channels, and information related to UE camping in a virtual cell, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may identify that the first cell is a virtual cell with a coverage area that includes a set of physical cells and corresponding physical cell coverage areas, receive, from a UE, a random access message as part of a random access procedure for transitioning the UE to a connected mode with the first cell, and provide, to the UE and in response to the random access message, information to either handover or redirect the UE to one of the set of physical cells within the coverage area of the first cell. The communications manager 1415 may also identify a virtual cell configuration for the DU, where the virtual cell configuration provides one or more UEs a virtual cell with a coverage area that includes a set of physical cells and corresponding physical cell coverage areas and communicate with the one or more UEs in accordance with the virtual cell configuration. The communications manager 1415 may also identify a virtual cell configuration for the CU, where the virtual cell configuration provides one or more UEs, a virtual cell with a coverage area that includes a set of physical cells and corresponding physical cell coverage areas and communicate with the set of DUs in accordance with the virtual cell configuration. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
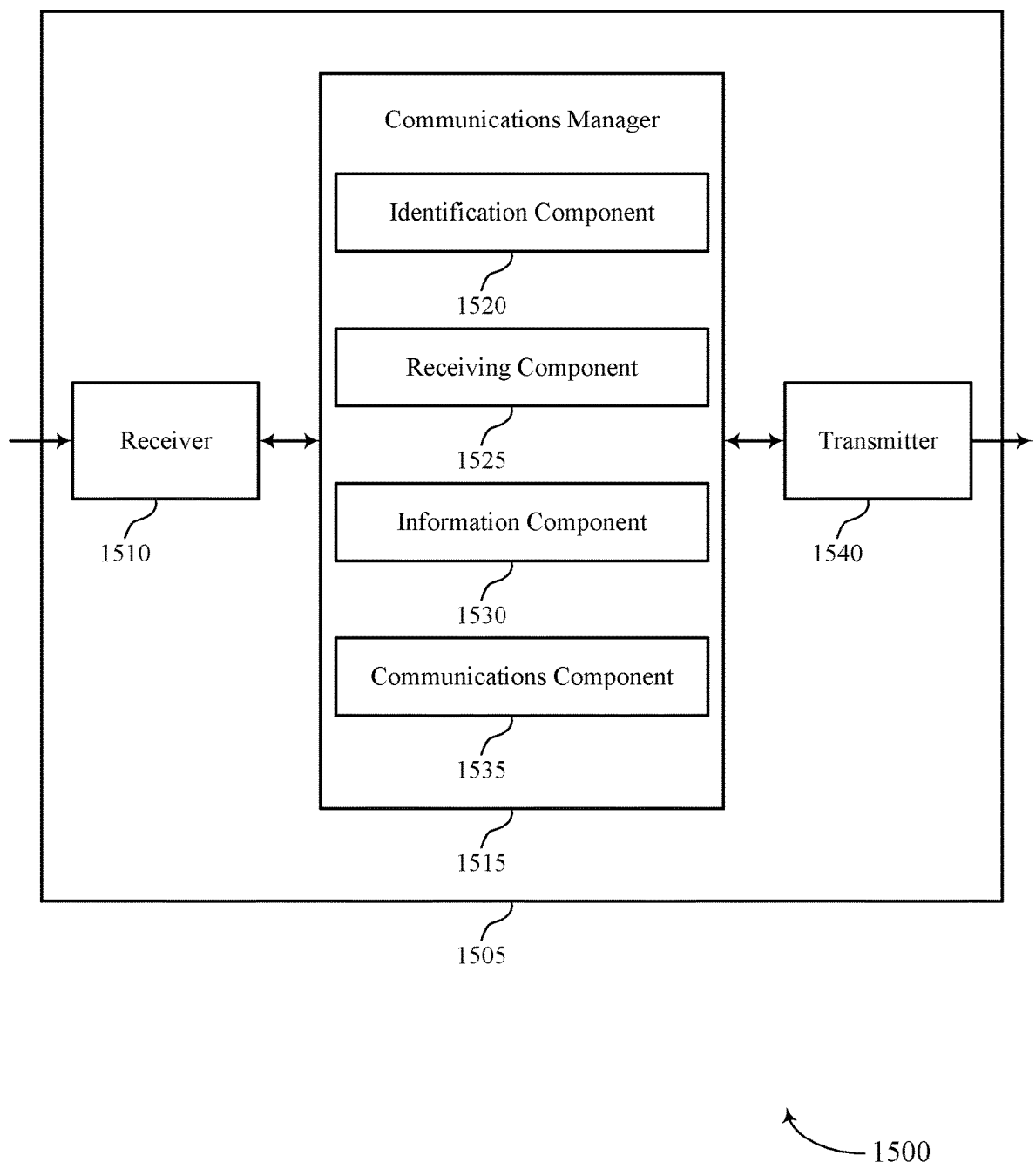

FIG. 15 shows a block diagram 1500 of a device 1505 that supports UE camping in a virtual cell in accordance with aspects of the present disclosure. The device 1505 may be an example of aspects of a device 1405, or a virtual cell as described herein. The device 1505 may include a receiver 1510, a communications manager 1515, and a transmitter 1540. The device 1505 may also include a processor. Each of these components may be in communication with one another (e.g., via one or more buses). As explained herein, the virtual cell may comprise a CU and a plurality of DUs, or simply a plurality of DUs.

The receiver 1510 may receive information such as packets, user data, or control information associated with various information channels (e.g., control channels, data channels, and information related to UE camping in a virtual cell, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include an identification component 1520, a receiving component 1525, an information component 1530, and a communications component 1535. The communications manager 1515 may be an example of aspects of the communications manager 1710 described herein.

The identification component 1520 may identify that the first cell is a virtual cell with a coverage area that includes a set of physical cells and corresponding physical cell coverage areas.

The receiving component 1525 may receive, from a UE, a random access message as part of a random access procedure for transitioning the UE to a connected mode with the first cell.

The information component 1530 may provide, to the UE and in response to the random access message, information to either handover or redirect the UE to one of the set of physical cells within the coverage area of the first cell.

The identification component 1520 may identify a virtual cell configuration for the DU, where the virtual cell configuration provides one or more UEs, a virtual cell with a coverage area that includes a set of physical cells and corresponding physical cell coverage areas.

The communications component 1535 may communicate with the one or more UEs in accordance with the virtual cell configuration.

The identification component 1520 may identify a virtual cell configuration for the CU, where the virtual cell configuration provides one or more UEs, a virtual cell with a coverage area that includes a set of physical cells and corresponding physical cell coverage areas.

The communications component 1535 may communicate with the set of DUs in accordance with the virtual cell configuration.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
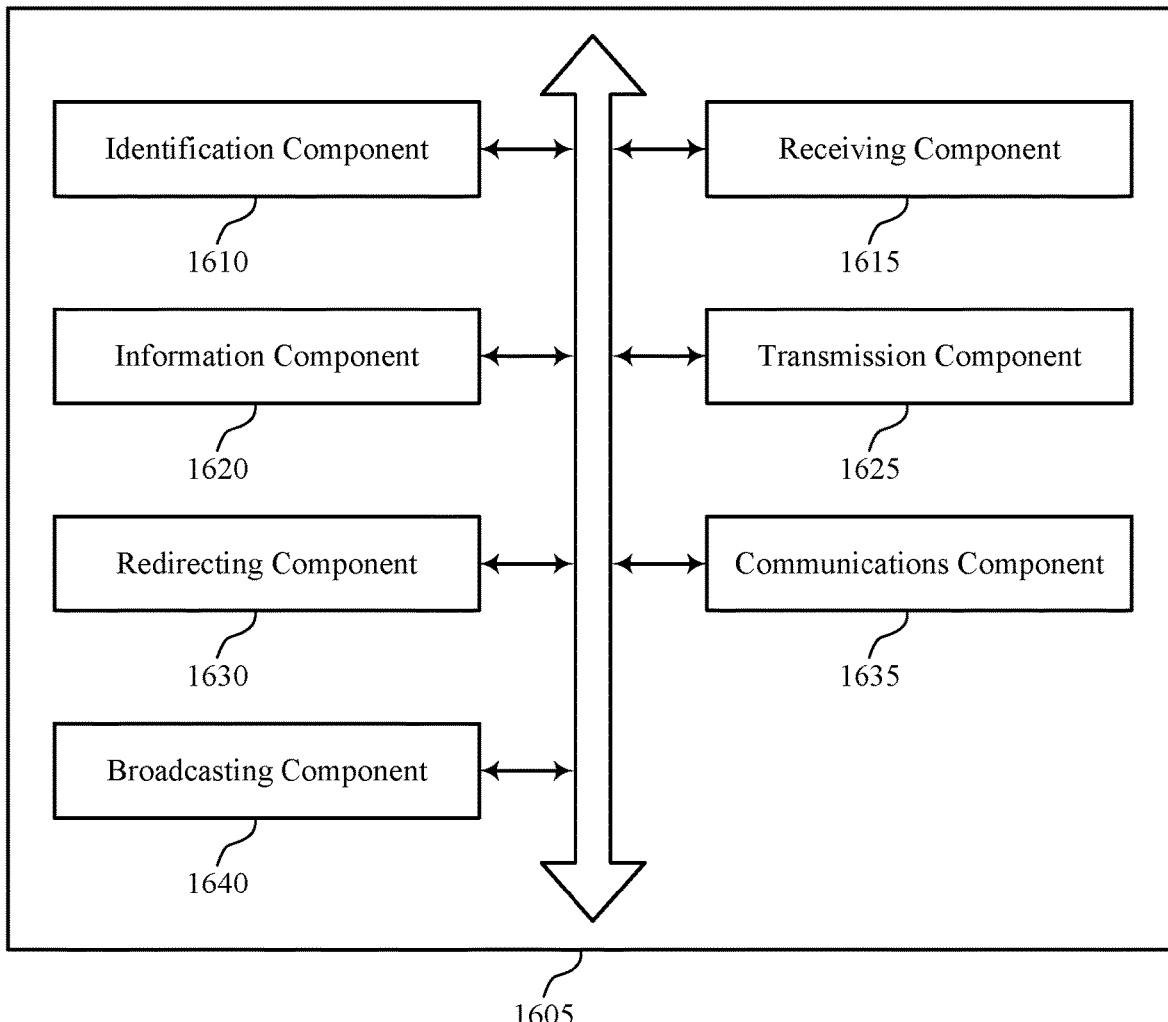
FIG. 16 shows a block diagram of a communications manager that supports UE camping in a virtual cell in accordance with aspects of the present disclosure.

FIG. 16 shows a block diagram 1600 of a communications manager 1605 that supports UE camping in a virtual cell in accordance with aspects of the present disclosure. The communications manager 1605 may be an example of aspects of a communications manager 1415, a communications manager 1515, or a communications manager 1710 described herein. The communications manager 1605 may include an identification component 1610, a receiving component 1615, an information component 1620, a transmission component 1625, a redirecting component 1630, a communications component 1635, and a broadcasting component 1640. Each of these modules may communicate, directly or indirectly, with one another (e.g., via one or more buses). As explained herein, the virtual cell may comprise a CU and a plurality of DUs, or simply a plurality of DUs. Therefore, the various components illustrated in FIG. 16 may also be distributed between the CU and DUs.

The identification component 1610 may identify that the first cell is a virtual cell with a coverage area that includes a set of physical cells and corresponding physical cell coverage areas.

In some examples, the identification component 1610 may identify a virtual cell configuration for the DU, where the virtual cell configuration provides one or more UEs, a virtual cell with a coverage area that includes a set of physical cells and corresponding physical cell coverage areas.

In some examples, the identification component 1610 may identify a virtual cell configuration for the CU, where the virtual cell configuration provides one or more UEs, a virtual cell with a coverage area that includes a set of physical cells and corresponding physical cell coverage areas.

In some examples, the identification component 1610 may identify signaling for transmission to the UE that is limited to either broadcast only or selective unicast. In some examples, the identification component 1610 may identify a specific UE for receiving a UE-specific transmission.

The receiving component 1615 may receive, from a UE, a random access message as part of a random access procedure for transitioning the UE to a connected mode with the first cell. In some examples, the receiving component 1615 may fail to receive acknowledgement of the indication, from the UE, due to lack of support by the UE for virtual cell connections. In some examples, the receiving component 1615 may receive receipt acknowledgment of the indication, from the UE, based on the UE having support for virtual cell connections.

In some examples, the receiving component 1615 may receive an indication from the UE via a random access message that the UE has support for virtual cell connections. In some examples, the receiving component 1615 may receive, at one of the set of physical cells, an RRC setup request. In some examples, the receiving component 1615 may receive the virtual cell configuration via one or more messages from the CU.

In some examples, the receiving component 1615 may receive one or more coordination messages from the CU, coordinating the DU and the other DUs to function with the CU as the virtual cell.

The information component 1620 may provide, to the UE and in response to the random access message, information to either handover or redirect the UE to one of the set of physical cells within the coverage area of the first cell. In some examples, the information component 1620 may provide information, to the UE, via the random access message that includes a timing advance and an uplink resource grant for communications with the one of the set of physical cells.

The communications component 1635 may communicate with the one or more UEs in accordance with the virtual cell configuration. In some examples, the communications component 1635 may communicate with the set of DUs in accordance with the virtual cell configuration. In some examples, the communications component 1635 may communicate an indication that transmissions from the first cell are limited to either broadcast only or selective unicast.

In some examples, the communications component 1635 may communicate a cell type in a SIB1 via broadcast only signaling.

In some examples, the communications component 1635 may communicate unicast permission to the UE, where the unicast permission is communicated to the UE via dedicated radio resource configuration signaling. In some examples, the communications component 1635 may communicate with the CU via an F1 interface for receipt of at least one of resource reservation, the virtual cell configuration, or broadcast scheduling.

In some examples, the communications component 1635 may communicate with a DU of the set of DUs via an F1 interface for receipt of at least one of resource reservation, the virtual cell configuration, or broadcast scheduling.

The transmission component 1625 may transmit the identified signals via at least one of a synchronization signal block (SSB) or a SIB to the UE. In some examples, the transmission component 1625 may transmit an RRC configuration in the UE-specific transmission. In some examples, the transmission component 1625 may transmit, to the UE, at least one of a master information block (MIB) or a SIB of the set of physical cells of the first cell.

In some examples, the transmission component 1625 may transmit information to the UE to transition from an idle mode or from an inactive mode to the connected mode with the first cell. In some examples, the transmission component 1625 may transmit an indication that is limited to either broadcast only or selective unicast. In some examples, the transmission component 1625 may transmit, to the UE and via an RRC reconfiguration message, handover information to allow the UE to communicate via RRC communications with the one of the set of physical cells.

In some examples, the transmission component 1625 may transmit redirection information in an RRC reject message to the UE. In some examples, the transmission component 1625 may transmit a random access response to the UE, where the random access response includes a timing advance, an uplink resource grant for communications with the one of the set of physical cells, and handover information for the UE to communicate with the one of the set of physical cells.

In some examples, the transmission component 1625 may transmit a random access response to the UE, where the random access response includes a timing advance and an uplink resource grant for communications with the one of the set of physical cells.

In some examples, the transmission component 1625 may transmit, in response to the RRC setup request message, an RRC setup message that includes handover information for lower-than-RRC-layer communications by the UE with the one of the set of physical cells.

In some examples, the transmission component 1625 may transmit the virtual cell configuration via one or more messages to a DU of the set of DUs.

In some examples, the transmission component 1625 may transmit one or more coordination messages to a DU of the set of DUs to coordinate the DU and the other DUs of the set of DUs to function with the CU as the virtual cell.

The redirecting component 1630 may redirect the UE to the one of the set of physical cells in accordance with the redirection information.

The broadcasting component 1640 may broadcast at least one of the MIB or SIB of at least one of the set of physical cells. In some examples, the broadcasting component 1640 may broadcast messages to the one or more UEs in accordance with the one or more coordination messages. In some examples, the broadcasting component 1640 may broadcast messages to the one or more UEs in accordance with the one or more coordination messages.

Figure 17:
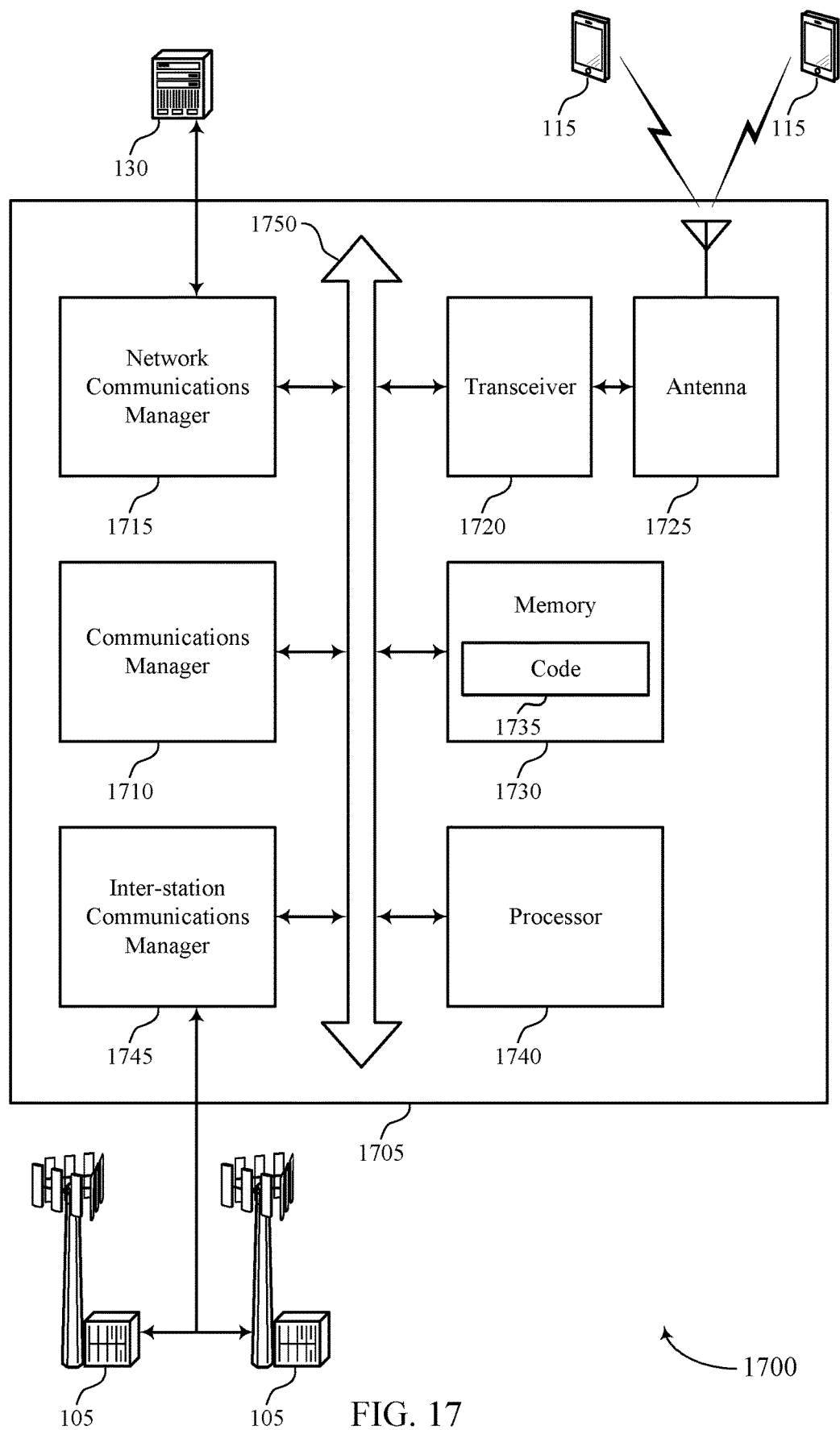
FIG. 17 shows a diagram of a system including a device that supports UE camping in a virtual cell in accordance with aspects of the present disclosure.

FIG. 17 shows a diagram of a system 1700 including a device 1705 that supports UE camping in a virtual cell in accordance with aspects of the present disclosure. The device 1705 may be an example of or include the components of a DU, a device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750). As explained herein, the virtual cell may comprise a CU and a plurality of DUs, or simply a plurality of DUs. Therefore, the various components illustrated in FIG. 17 may also be distributed between the CU and DUs.

The communications manager 1710 may identify that the first cell is a virtual cell with a coverage area that includes a set of physical cells and corresponding physical cell coverage areas, receive, from a UE, a random access message as part of a random access procedure for transitioning the UE to a connected mode with the first cell, and provide, to the UE and in response to the random access message, information to either handover or redirect the UE to one of the set of physical cells within the coverage area of the first cell. The communications manager 1710 may also identify a virtual cell configuration for the DU, where the virtual cell configuration provides one or more UEs a virtual cell with a coverage area that includes a set of physical cells and corresponding physical cell coverage areas and communicate with the one or more UEs in accordance with the virtual cell configuration. The communications manager 1710 may also identify a virtual cell configuration for the CU, where the virtual cell configuration provides one or more UEs, a virtual cell with a coverage area that includes a set of physical cells and corresponding physical cell coverage areas and communicate with the set of DUs in accordance with the virtual cell configuration.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting UE camping in a virtual cell).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
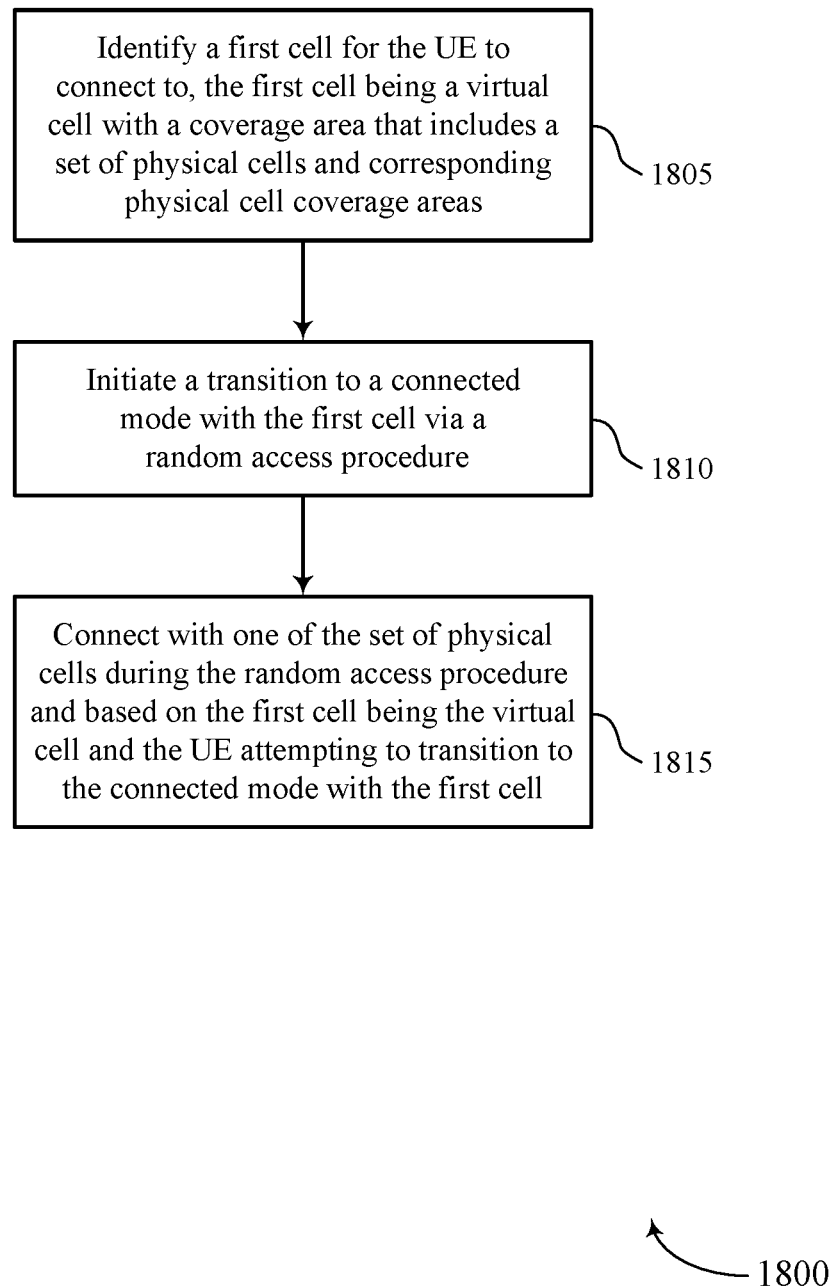
FIGS. 18 through 21 show flowcharts illustrating methods that support UE camping in a virtual cell in accordance with aspects of the present disclosure.

FIG. 18 shows a flowchart illustrating a method 1800 that supports UE camping in a virtual cell in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may identify a first cell for the UE to connect to, the first cell being a virtual cell with a coverage area that includes a set of physical cells and corresponding physical cell coverage areas. The operations of 1805 may be performed according to the methods described herein. In some examples, aspects of the operations of 1805 may be performed by an identification component as described with reference to FIGS. 10 through 13.

At 1810, the UE may initiate a transition to a connected mode with the first cell via a random access procedure. The operations of 1810 may be performed according to the methods described herein. In some examples, aspects of the operations of 1810 may be performed by a transition component as described with reference to FIGS. 10 through 13.

At 1815, the UE may connect with one of the set of physical cells during the random access procedure and based on the first cell being the virtual cell and the UE attempting to transition to the connected mode with the first cell. The operations of 1815 may be performed according to the methods described herein. In some examples, aspects of the operations of 1815 may be performed by a connection component as described with reference to FIGS. 10 through 13.

Figure 19:
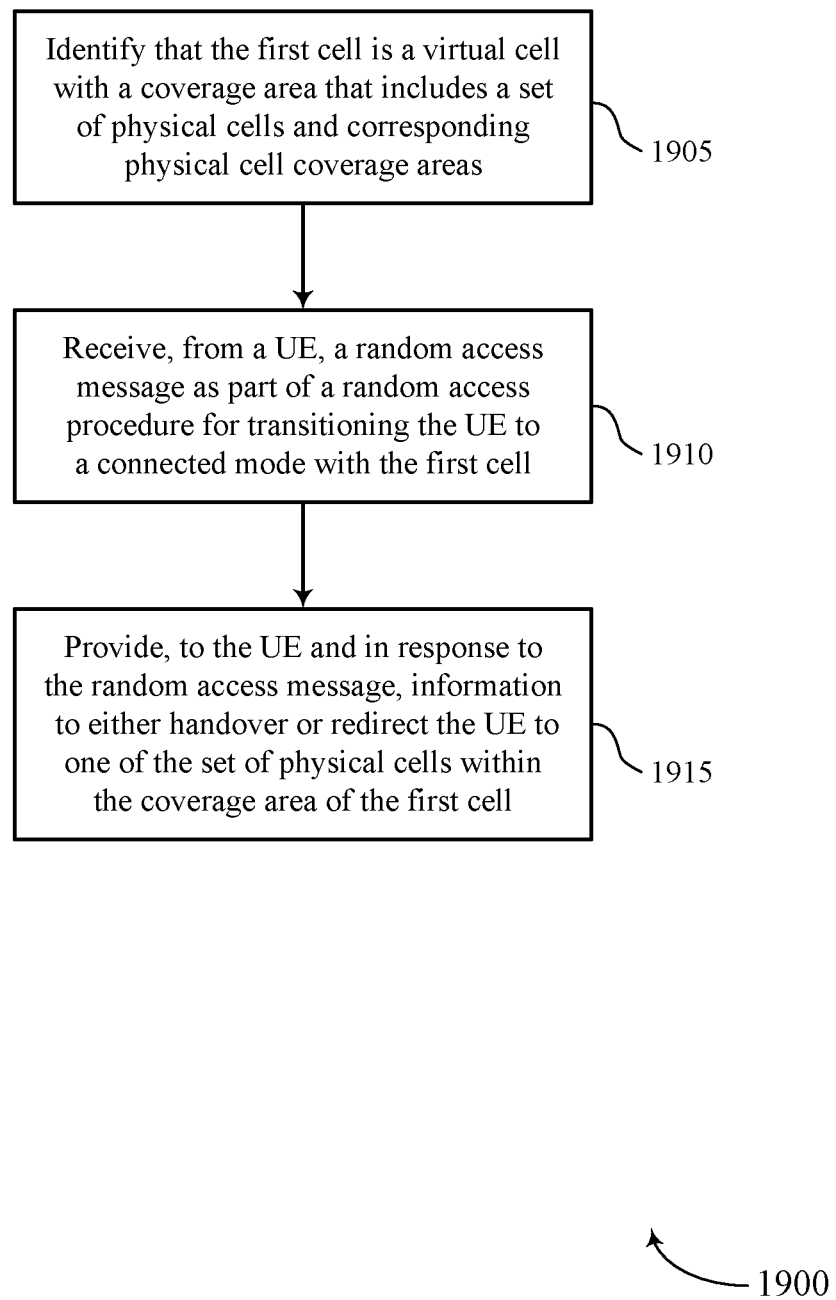

FIG. 19 shows a flowchart illustrating a method 1900 that supports UE camping in a virtual cell in accordance with aspects of the present disclosure. The operations of method 1900 may be implemented by a base station 105 or its components as described herein. For example, the operations of method 1900 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 1905, the base station may identify that the first cell is a virtual cell with a coverage area that includes a set of physical cells and corresponding physical cell coverage areas. The operations of 1905 may be performed according to the methods described herein. In some examples, aspects of the operations of 1905 may be performed by an identification component as described with reference to FIGS. 14 through 17.

At 1910, the base station may receive, from a UE, a random access message as part of a random access procedure for transitioning the UE to a connected mode with the first cell. The operations of 1910 may be performed according to the methods described herein. In some examples, aspects of the operations of 1910 may be performed by a receiving component as described with reference to FIGS. 14 through 17.

At 1915, the base station may provide, to the UE and in response to the random access message, information to either handover or redirect the UE to one of the set of physical cells within the coverage area of the first cell. The operations of 1915 may be performed according to the methods described herein. In some examples, aspects of the operations of 1915 may be performed by an information component as described with reference to FIGS. 14 through 17.

Figure 20:
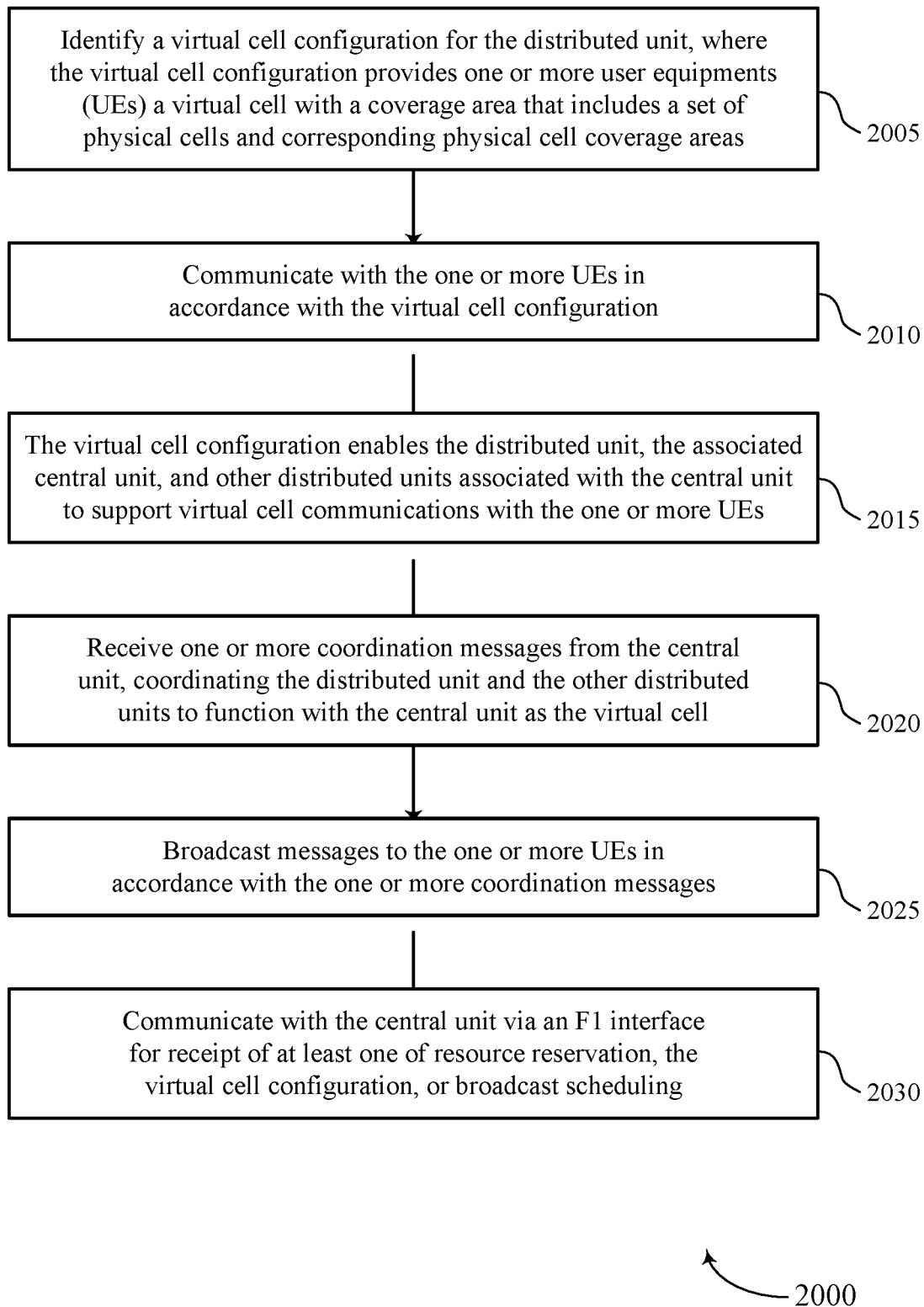

FIG. 20 shows a flowchart illustrating a method 2000 that supports UE camping in a virtual cell in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2005, the base station may identify a virtual cell configuration for the DU, where the virtual cell configuration provides one or more UEs a virtual cell with a coverage area that includes a set of physical cells and corresponding physical cell coverage areas. In some examples, the base station may identify a virtual cell configuration for the base station, wherein the virtual cell configuration provides one or more UEs with a virtual cell having a coverage area that includes a plurality of physical cells and corresponding physical cell coverage areas. The operations of 2005 may be performed according to the methods described herein. In some examples, aspects of the operations of 2005 may be performed by an identification component as described with reference to FIGS. 14 through 17.

At 2010, the base station may communicate with the one or more UEs in accordance with the virtual cell configuration. In some examples, the base station may communicate with the one or more UEs or at least one of the plurality of other base stations in accordance with the virtual cell configuration. The operations of 2010 may be performed according to the methods described herein. In some examples, aspects of the operations of 2010 may be performed by a communications component as described with reference to FIGS. 14 through 17.

At 2015, the base station may the virtual cell configuration enables the DU, the associated CU, and other DUs associated with the CU to support virtual cell communications with the one or more UEs. The operations of 2015 may be performed according to the methods described herein. In some examples, aspects of the operations of 2015 may be performed by a DU, which in some examples may be a base station, as described with reference to FIGS. 14 through 17.

At 2020, the base station may receive one or more coordination messages from the CU, coordinating the DU and the other DUs to function with the CU as the virtual cell. The operations of 2020 may be performed according to the methods described herein. In some examples, aspects of the operations of 2020 may be performed by a receiving component as described with reference to FIGS. 14 through 17.

At 2025, the base station may broadcast messages to the one or more UEs in accordance with the one or more coordination messages. The operations of 2025 may be performed according to the methods described herein. In some examples, aspects of the operations of 2025 may be performed by a broadcasting component as described with reference to FIGS. 14 through 17.

At 2030, the base station may communicate with the CU via an F1 interface for receipt of at least one of resource reservation, the virtual cell configuration, or broadcast scheduling. The operations of 2030 may be performed according to the methods described herein. In some examples, aspects of the operations of 2030 may be performed by a communications component as described with reference to FIGS. 14 through 17.

Figure 21:
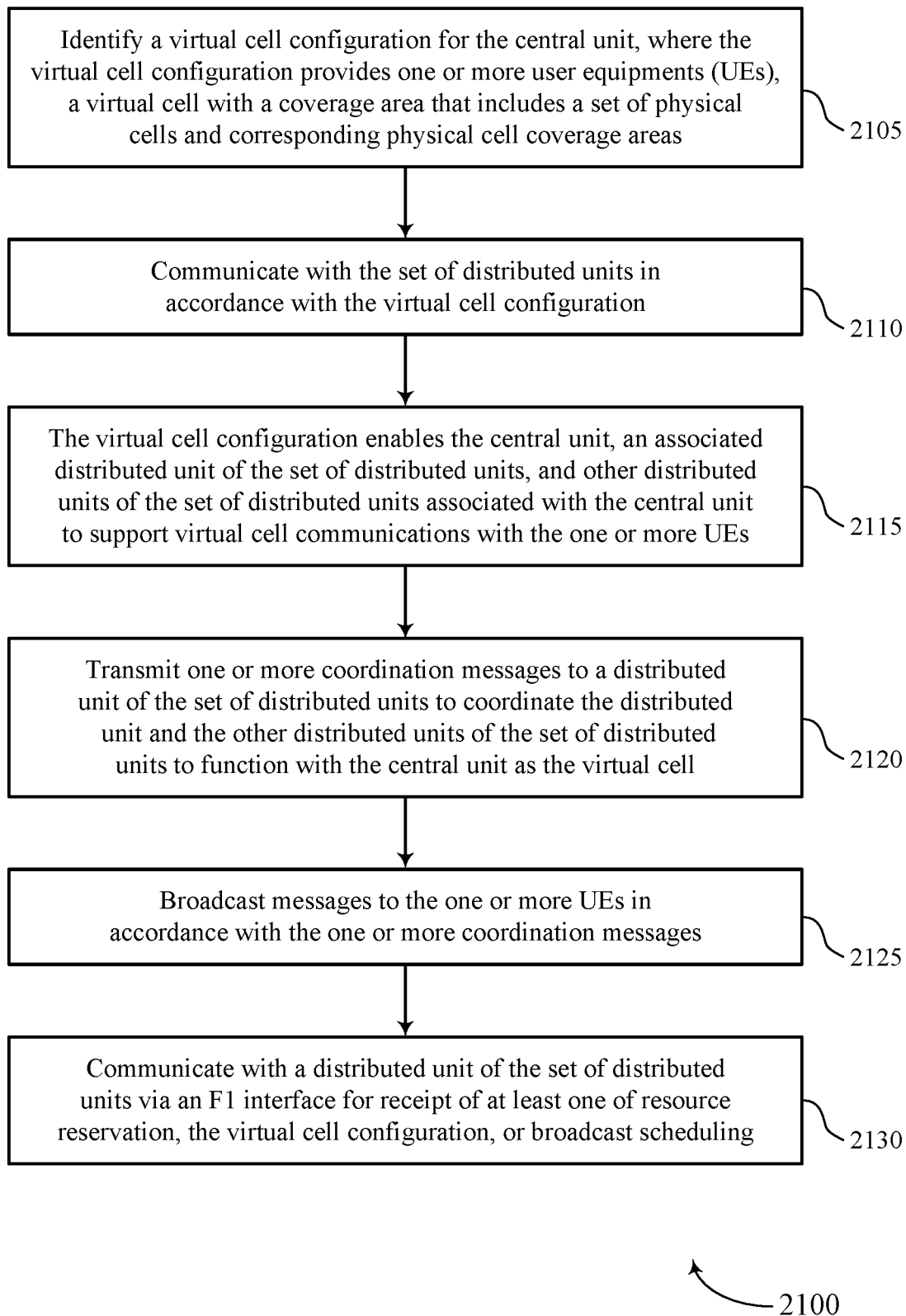

FIG. 21 shows a flowchart illustrating a method 2100 that supports UE camping in a virtual cell in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may identify a virtual cell configuration for the CU, where the virtual cell configuration provides one or more UEs, a virtual cell with a coverage area that includes a set of physical cells and corresponding physical cell coverage areas. In some examples, the base station may identify a virtual cell configuration for the base station, wherein the virtual cell configuration provides one or more UEs with a virtual cell having a coverage area that includes a plurality of physical cells and corresponding physical cell coverage areas. The operations of 2105 may be performed according to the methods described herein. In some examples, aspects of the operations of 2105 may be performed by an identification component as described with reference to FIGS. 14 through 17.

At 2110, the base station may communicate with the set of DUs in accordance with the virtual cell configuration. In some examples, the base station may communicate with the one or more UEs or at least one of the plurality of other base stations in accordance with the virtual cell configuration. The operations of 2110 may be performed according to the methods described herein. In some examples, aspects of the operations of 2110 may be performed by a communications component as described with reference to FIGS. 14 through 17.

At 2115, the base station may the virtual cell configuration enables the CU, an associated DU of the set of DUs, and other DUs of the set of DUs associated with the CU to support virtual cell communications with the one or more UEs. The operations of 2115 may be performed according to the methods described herein. In some examples, aspects of the operations of 2115 may be performed by a CU, which in some examples may be a logical node or in some examples may be a base station, as described with reference to FIGS. 14 through 17.

At 2120, the base station may transmit one or more coordination messages to a DU of the set of DUs to coordinate the DU and the other DUs of the set of DUs to function with the CU as the virtual cell. The operations of 2120 may be performed according to the methods described herein. In some examples, aspects of the operations of 2120 may be performed by a transmission component as described with reference to FIGS. 14 through 17.

At 2125, the base station may broadcast messages to the one or more UEs in accordance with the one or more coordination messages. The operations of 2125 may be performed according to the methods described herein. In some examples, aspects of the operations of 2125 may be performed by a broadcasting component as described with reference to FIGS. 14 through 17.

At 2130, the base station may communicate with a DU of the set of DUs via an F1 interface for receipt of at least one of resource reservation, the virtual cell configuration, or broadcast scheduling. The operations of 2130 may be performed according to the methods described herein. In some examples, aspects of the operations of 2130 may be performed by a communications component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Example 1

A method for wireless communication at a base station coupled with a plurality of other base stations, comprising: identifying a virtual cell configuration for the base station, wherein the virtual cell configuration provides one or more UEs with a virtual cell having a coverage area that includes a plurality of physical cells and corresponding physical cell coverage areas; and communicating with the one or more UEs or at least one of the plurality of other base stations in accordance with the virtual cell configuration.

Example 2

The method of example 1, wherein identifying the virtual cell configuration further comprises: receiving the virtual cell configuration via one or more messages from a central unit coupled with the base station.

Example 3

The method of any of examples 1 or 2, wherein identifying the virtual cell configuration further comprises: transmitting the virtual cell configuration via one or more messages to a base station of the plurality of other base stations.

Example 4

The method of any of examples 1 to 3, wherein the virtual cell configuration enables the base station, a central unit associated with the base station and at least a subset of the plurality of other base stations, and the subset of the plurality of other base stations associated with the central unit to support virtual cell communications with the one or more UEs.

Example 5

The method of any of examples 1 to 4, further comprising: receiving one or more coordination messages from the central unit, coordinating the base station and the plurality of other base stations to function with the central unit as the virtual cell; and broadcasting messages to the one or more UEs in accordance with the one or more coordination messages.

Example 6

The method of any of examples 1 to 5, wherein the central unit is one of the plurality of other base stations, wherein the base station is a gNodeB, and wherein the plurality of other base stations are each separate gNodeBs.

Example 7

The method of any of examples 1 to 5, wherein the central unit is part of a central unit-distributed unit pair.

Example 8

The method of any of examples 1 to 5, further comprising: communicating with the central unit via an F1 interface for receipt of at least one of a resource reservation, the virtual cell configuration, or a broadcast scheduling.

Example 9

The method of any of examples 1 to 8, wherein the virtual cell configuration enables the base station to support virtual cell communications with the one or more UEs, the base station having a plurality of intra-frequency cells that form the virtual cell.

Example 10

The method of any of examples 1 to 9, wherein the base station is a lower-layer split distributed unit, the plurality of other base stations are lower-layer split distributed units, and wherein the virtual cell configuration enables the lower-layer split distributed unit and the other lower-layer split distributed units, each associated with a central unit, to support virtual cell communications with the one or more UEs.

Example 11

The method of any of examples 1 to 10, wherein the base station is a central unit, further comprising: transmitting one or more coordination messages to a second base station of the plurality of other base stations to coordinate the second base station and the other base stations of the plurality of base stations to function with the central unit as the virtual cell; and broadcasting messages to the one or more UEs in accordance with the one or more coordination messages.

Example 12

An apparatus comprising at least one means for performing a method of any of examples 1 to 11.

Example 13

An apparatus for wireless communications comprising a processor; memory coupled with the processor; and instructions stored in the memory and executable by the processor to cause the apparatus to perform a method of any of examples 1 to 11.

Example 14

A non-transitory computer-readable medium storing code for wireless communications, the code comprising instructions executable by a processor to perform a method of any of examples 1 to 11.

Example 15

A method for wireless communication at a first cell in a wireless communication system that includes a central unit coupled with each of a plurality of distributed units, comprising: identifying that the first cell is a virtual cell with a coverage area that includes a plurality of physical cells and corresponding physical cell coverage areas; receiving, from a UE, a random access message as part of a random access procedure for transitioning the UE to a connected mode with the first cell; and providing, to the UE and in response to the random access message, information to either handover or redirect the UE to one of the plurality of physical cells within the coverage area of the first cell.

Example 16

The method of example 15, further comprising: identifying signaling for transmission to the UE that is limited to either broadcast only or selective unicast; and transmitting the identified signaling via at least one of a SSB or a SIB to the UE.

Example 17

The method of any of examples 15 or 16, wherein providing, to the UE and in response to the random access message, information to either handover or redirect the UE further comprises: identifying a specific UE for receiving a UE-specific transmission; and transmitting a RRC configuration in the UE-specific transmission.

Example 18

The method of any of examples 15 to 17, further comprising: transmitting, to the UE, at least one of a MIB or a SIB of the plurality of physical cells of the first cell.

Example 19

The method of any of examples 15 to 18, wherein providing, to the UE and in response to the random access message, information to either handover or redirect the UE further comprises: transmitting information to the UE to transition from an idle mode or from an inactive mode to the connected mode with the first cell.

Example 20

The method of any of examples 15 to 10, further comprising: transmitting an indication that is limited to either broadcast only or selective unicast.

Example 21

The method of any of examples 15 to 20, wherein providing, to the UE and in response to the random access message, information to either handover or redirect the UE further comprises: providing information, to the UE, via the random access message that includes a timing advance and an uplink resource grant for communications with the one of the plurality of physical cells.

Example 22

The method of example 21, further comprising: transmitting, to the UE and via a RRC reconfiguration message, handover information to allow the UE to communicate via RRC communications with the one of the plurality of physical cells.

Example 23

The method of any of examples 15 to 20, wherein: communications between transmission of the random access message and transmission of the RRC reconfiguration message are split such that RRC-layer communications are via the first cell but that lower-than-RRC-layer communications are via one of the plurality of physical cells

Example 24

The method of any of examples 15 to 17, wherein providing, to the UE and in response to the random access message, information to either handover or redirect the UE further comprises: transmitting redirection information in a RRC reject message to the UE; and redirecting the UE to the one of the plurality of physical cells in accordance with the redirection information.

Example 25

The method of any of examples 15 to 24, further comprising: communicating an indication that transmissions from the first cell are limited to either broadcast only or selective unicast; and receiving receipt acknowledgment of the indication, from the UE, based at least in part on the UE having support for virtual cell connections.

Example 26

The method of any of examples 15 to 25, further comprising: receiving an indication from the UE via the random access message that the UE has support for virtual cell connections.

Example 27

The method of any of examples 15 to 26, wherein providing, to the UE and in response to the random access message, information to either handover or redirect the UE further comprises: transmitting a random access response to the UE, wherein the random access response includes a timing advance, an uplink resource grant for communications with the one of the plurality of physical cells, and handover information for the UE to communicate with the one of the plurality of physical cells.

Example 28

The method of any of examples 15 to 27, wherein the handover information includes one or more of a RAPID, a target cell index of the one of the plurality of physical cells, or bandwidth part information.

Example 29

The method of any of examples 15 to 28, wherein providing, to the UE and in response to the random access message, information to either handover or redirect the UE further comprises: transmitting a random access response to the UE, wherein the random access response includes a timing advance and an uplink resource grant for communications with the one of the plurality of physical cells; and receiving, at one of the plurality of physical cells, a RRC setup request.

Example 30

The method of any of examples 15 to 29, further comprising: transmitting, in response to the RRC setup request, an RRC setup message that includes handover information for lower-than-RRC-layer communications by the UE with the one of the plurality of physical cells.

Example 31

The method of any of examples 15 to 30, wherein the first cell is supported by a central unit and one or more distributed units associated with the central unit, by a plurality of distributed units associated with a single central unit, or by a plurality of lower-layer split distributed units associated with a single lower-layer split central unit.

Example 32

An apparatus comprising at least one means for performing a method of any of examples 15 to 31.

Example 33

An apparatus for wireless communications comprising a processor; memory coupled with the processor; and instructions stored in the memory and executable by the processor to cause the apparatus to perform a method of any of examples 15 to 31.

Example 34

A non-transitory computer-readable medium storing code for wireless communications, the code comprising instructions executable by a processor to perform a method of any of examples 15 to 31.

Example 35

A method for wireless communication at a UE, comprising: identifying a first cell for the UE to connect to, the first cell being a virtual cell with a coverage area that includes a plurality of physical cells and corresponding physical cell coverage areas; initiating a transition to a connected mode with the first cell via a random access procedure; and connecting with one of the plurality of physical cells during the random access procedure and based at least in part on the first cell being the virtual cell and the UE attempting to transition to the connected mode with the first cell.

Example 36

The method of example 35, wherein connecting with one of the plurality of physical cells during the random access procedure comprises: receiving a random access response from the first cell, wherein the random access response includes a timing advance and an uplink resource grant for communications with the one of the plurality of physical cells.

Example 37

The method of any of examples 35 or 36, further comprising: receiving, from the first cell and via a RRC reconfiguration message, handover information to allow the UE to communicate via RRC communications with the one of the plurality of physical cells.

Example 38

The method of any of examples 35 to 37, wherein: UE communications between receipt of the random access response from the first cell and receipt of the RRC reconfiguration message from the first cell are split such that UE RRC-layer communications are with the first cell but that lower-than-RRC-layer communications by the UE are with the one of the plurality of physical cells.

Example 39

The method of any of examples 35 to 38, further comprising: identifying that the first cell is the virtual cell.

Example 40

The method of any of examples 35 to 39, further comprising: monitoring for at least one of a SSB or a SIB of the first cell; and identifying, based at least in part on the SSB or SIB of the first cell, that transmissions from the first cell are limited to either broadcast only or selective unicast.

Example 41

The method of any of examples 35 to 40, wherein connecting with one of the plurality of physical cells comprises: receiving a RRC configuration; and identifying, based at least in part on the RRC configuration, that transmissions from the first cell are UE-specific transmissions.

Example 42

The method of any of examples 35 to 41, further comprising: receiving, from the first cell, at least one of a MIB or a SIB of the plurality of physical cells of the first cell.

Example 43

The method of any of examples 35 to 42, wherein initiating the transition to the connected mode with the first cell further comprises: transitioning from an idle mode or from an inactive mode to the connected mode with the first cell.

Example 44

The method of any of examples 35 to 43, further comprising: receiving an indication that transmissions from the first cell are limited to either broadcast only or selective unicast.

Example 45

The method of example 40, wherein connecting with one of the plurality of physical cells during the random access procedure comprises: receiving redirection information in a RRC reject message from the first cell; and redirecting to the one of the plurality of physical cells in accordance with the redirection information.

Example 46

The method of any of examples 35 to 45, further comprising: receiving an indication that transmissions from the first cell are limited to either broadcast only or selective unicast; and interpreting the indication based at least in part on the UE having support for virtual cell connections.

Example 47

The method of example 46, wherein initiating the transition to the connected mode with the first cell via the random access procedure wherein connecting with one of the plurality of physical cells during the random access procedure comprises: indicating to the first cell and via a random access request message that the UE has support for virtual cell connections.

Example 48

The method of example 47, wherein connecting with one of the plurality of physical cells during the random access procedure comprises: receiving a random access response from the first cell, wherein the random access response includes a timing advance, an uplink resource grant for communications with the one of the plurality of physical cells, and handover information for the UE to communicate with the one of the plurality of physical cells.

Example 49

The method of example 48, wherein the handover information includes one or more of a RAPID, a target cell index of the one of the plurality of physical cells, or bandwidth part information.

Example 50

The method of example 48, wherein the handover information is included within a MAC CE of the random access response.

Example 51

The method of example 46, wherein connecting with one of the plurality of physical cells during the random access procedure comprises: receiving a random access response from the first cell, wherein the random access response includes a timing advance and an uplink resource grant for communications with the one of the plurality of physical cells; and transmitting, to the one of the plurality of physical cells and response to the random access response, a RRC setup request.

Example 52

An apparatus comprising at least one means for performing a method of any of examples 35 to 51.

Example 53

An apparatus for wireless communications comprising a processor; memory coupled with the processor; and instructions stored in the memory and executable by the processor to cause the apparatus to perform a method of any of examples 35 to 51.

Example 54

A non-transitory computer-readable medium storing code for wireless communications, the code comprising instructions executable by a processor to perform a method of any of examples 35 to 51.

Example 55

A method for wireless communication at a distributed unit associated with a central unit, comprising: identifying a virtual cell configuration for the distributed unit, wherein the virtual cell configuration provides one or more UEs a virtual cell with a coverage area that includes a plurality of physical cells and corresponding physical cell coverage areas; and communicating with the one or more UEs in accordance with the virtual cell configuration.

Example 56

The method of example 55, wherein identifying the virtual cell configuration further comprises: receiving the virtual cell configuration via one or more messages from the central unit.

Example 57

The method of any of examples 55 or 56, wherein the virtual cell configuration enables the distributed unit, the associated central unit, and other distributed units associated with the central unit to support virtual cell communications with the one or more UEs.

Example 58

The method of example 57, further comprising: receiving one or more coordination messages from the central unit, coordinating the distributed unit and the other distributed units to function with the central unit as the virtual cell; and broadcasting messages to the one or more UEs in accordance with the one or more coordination messages.

Example 59

The method of example 58, wherein the distributed unit is a gNodeB, and wherein the other distributed units and the central unit are each separate gNodeBs.

Example 60

The method of example 58, wherein the distributed unit is a gNodeB, the other distributed units are also separate gNodeBs, and wherein the central unit is part of a central unit-distributed unit pair.

Example 61

The method of example 58, further comprising: communicating with the central unit via an F1 interface for receipt of at least one of resource reservation, the virtual cell configuration, or broadcast scheduling.

Example 62

The method of any of examples 55 to 61, wherein the virtual cell configuration enables the distributed unit to support virtual cell communications with the one or more UEs, the distributed unit having a plurality of intra-frequency cells that form the virtual cell.

Example 63

The method of any of examples 55 to 62, wherein the distributed unit is a lower-layer split distributed unit, and wherein the virtual cell configuration enables the lower-layer split distributed unit and other lower-layer split distributed units, each associated with the central unit, to support virtual cell communications with the one or more UEs.

Example 64

An apparatus comprising at least one means for performing a method of any of examples 55 to 62.

Example 65

An apparatus for wireless communications comprising a processor; memory coupled with the processor; and instructions stored in the memory and executable by the processor to cause the apparatus to perform a method of any of examples 55 to 62.

Example 66

A non-transitory computer-readable medium storing code for wireless communications, the code comprising instructions executable by a processor to perform a method of any of examples 55 to 62.

Example 67

A method for wireless communication at a central unit associated with a plurality of distributed units, comprising: identifying a virtual cell configuration for the central unit, wherein the virtual cell configuration provides one or more UEs, a virtual cell with a coverage area that includes a plurality of physical cells and corresponding physical cell coverage areas; and communicating with the plurality of distributed units in accordance with the virtual cell configuration.

Example 68

The method of example 67, wherein identifying the virtual cell configuration further comprises: transmitting the virtual cell configuration via one or more messages to a distributed unit of the plurality of distributed units.

Example 69

The method of any of examples 67 or 68, wherein the virtual cell configuration enables the central unit, an associated distributed unit of the plurality of distributed units, and other distributed units of the plurality of distributed units associated with the central unit to support virtual cell communications with the one or more UEs.

Example 70

The method of example 69, further comprising: transmitting one or more coordination messages to a distributed unit of the plurality of distributed units to coordinate the distributed unit and the other distributed units of the plurality of distributed units to function with the central unit as the virtual cell; and broadcasting messages to the one or more UEs in accordance with the one or more coordination messages.

Example 71

The method of example 70, wherein the distributed unit of the plurality of distributed units is a gNodeB, and wherein the other distributed units of the plurality of distributed units and the central unit are each separate gNodeBs.

Example 72

The method of example 70, wherein the distributed unit of the plurality of distributed units is a gNodeB, the other distributed units of the plurality of distributed units are also separate gNodeBs, and wherein the central unit is part of a central unit-distributed unit pair.

Example 73

The method of example 70, further comprising: communicating with the distributed unit of the plurality of distributed units via an F1 interface for receipt of at least one of resource reservation, the virtual cell configuration, or broadcast scheduling.

Example 74

The method of any of examples 67 to 73, wherein a distributed unit of the plurality of distributed units is a lower-layer split distributed unit, and wherein the virtual cell configuration enables the lower-layer split distributed unit and other lower-layer split distributed units, each associated with the central unit, to support virtual cell communications with the one or more UEs.

Example 75

An apparatus comprising at least one means for performing a method of any of examples 67 to 74.

Example 76

An apparatus for wireless communications comprising a processor; memory coupled with the processor; and instructions stored in the memory and executable by the processor to cause the apparatus to perform a method of any of examples 67 to 74.

Example 77

A non-transitory computer-readable medium storing code for wireless communications, the code comprising instructions executable by a processor to perform a method of any of examples 67 to 74.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a first cell for the UE to connect to, the first cell being a virtual cell with a coverage area that includes a plurality of physical cells and corresponding physical cell coverage areas;
    initiating a transition to a connected mode with the first cell via a random access procedure; and
    connecting with one of the plurality of physical cells during the random access procedure and based at least in part on the first cell being the virtual cell and the UE attempting to transition to the connected mode with the first cell, wherein connecting with one of the plurality of physical cells during the random access procedure comprises: receiving a random access response from the first cell, wherein the random access response includes a timing advance and an uplink resource grant for communications with the one of the plurality of physical cells.

2. The method of claim 1, further comprising:
    receiving, from the first cell and via a radio resource control (RRC) reconfiguration message, handover information to allow the UE to communicate via RRC communications with the one of the plurality of physical cells.

3. The method of claim 2, wherein:
    UE communications between receipt of the random access response from the first cell and receipt of the RRC reconfiguration message from the first cell are split such that UE RRC-layer communications are with the first cell but that lower-than-RRC-layer communications by the UE are with the one of the plurality of physical cells.

4. The method of claim 1, further comprising:
identifying that the first cell is the virtual cell.

5. The method of claim 1, further comprising:
monitoring for at least one of a synchronization signal block (SSB) or a system information block (SIB) of the first cell; and
identifying, based at least in part on the SSB or SIB of the first cell, that transmissions from the first cell are limited to either broadcast only or selective unicast.

6. The method of claim 1, wherein connecting with one of the plurality of physical cells comprises:
receiving a radio resource control (RRC) configuration; and
identifying, based at least in part on the RRC configuration, that transmissions from the first cell are UE-specific transmissions.

7. The method of claim 1, further comprising:
receiving, from the first cell, at least one of a master information block (MIB) or a system information block (SIB) of the plurality of physical cells of the first cell.

8. The method of claim 1, wherein initiating the transition to the connected mode with the first cell further comprises:
transitioning from an idle mode or from an inactive mode to the connected mode with the first cell.

9. The method of claim 1, further comprising:
receiving an indication that transmissions from the first cell are limited to either broadcast only or selective unicast; and
failing to interpret the indication due to lack of support by the UE for virtual cell connections.

10. The method of claim 9, wherein connecting with one of the plurality of physical cells during the random access procedure comprises:
receiving redirection information in a radio resource control (RRC) reject message from the first cell; and
redirecting to the one of the plurality of physical cells in accordance with the redirection information.

11. The method of claim 1, further comprising:
receiving an indication that transmissions from the first cell are limited to either broadcast only or selective unicast; and
interpreting the indication based at least in part on the UE having support for virtual cell connections.

12. The method of claim 11, wherein initiating the transition to the connected mode with the first cell via the random access procedure wherein connecting with one of the plurality of physical cells during the random access procedure comprises:
indicating to the first cell and via a random access request message that the UE has support for virtual cell connections.

13. The method of claim 12, wherein connecting with one of the plurality of physical cells during the random access procedure comprises:
receiving a random access response from the first cell, wherein the random access response includes a timing advance, an uplink resource grant for communications with the one of the plurality of physical cells, and handover information for the UE to communicate with the one of the plurality of physical cells.

14. The method of claim 13, wherein the handover information includes one or more of a random access preamble identifier (RAPID), a target cell index of the one of the plurality of physical cells, or bandwidth part information.

15. The method of claim 13, wherein the handover information is included within a medium access control (MAC) control element (CE) of the random access response.

16. The method of claim 11, wherein connecting with one of the plurality of physical cells during the random access procedure comprises:
receiving a random access response from the first cell, wherein the random access response includes a timing advance and an uplink resource grant for communications with the one of the plurality of physical cells; and
transmitting, to the one of the plurality of physical cells and response to the random access response, a radio resource control (RRC) setup request.

17. The method of claim 16, wherein connecting with one of the plurality of physical cells during the random access procedure further comprises:
receiving, in response to the RRC setup request, an RRC setup message that includes handover information for lower-than-RRC-layer communications by the UE with the one of the plurality of physical cells.

18. An apparatus for wireless communication at a user equipment (UE), comprising:
a processor,
memory coupled to the processor; and
instructions stored in the memory and executable by the processor to cause the apparatus to:
identify a first cell for the UE to connect to, the first cell being a virtual cell with a coverage area that includes a plurality of physical cells and corresponding physical cell coverage areas;
initiate a transition to a connected mode with the first cell via a random access procedure; and
connect with one of the plurality of physical cells during the random access procedure and based at least in part on the first cell being the virtual cell and the UE attempting to transition to the connected mode with the first cell, wherein connecting with one of the plurality of physical cells during the random access procedure comprises: receiving a random access response from the first cell, wherein the random access response includes a timing advance and an uplink resource grant for communications with the one of the plurality of physical cells.

19. The apparatus of claim 18, wherein the instructions are further executable by the processor to cause the apparatus to:
receive, from the first cell and via a radio resource control (RRC) reconfiguration message, handover information to allow the UE to communicate via RRC communications with the one of the plurality of physical cells.

20. The apparatus of claim 19, wherein UE communications between receipt of the random access response from the first cell and receipt of the RRC reconfiguration message from the first cell are split such that UE RRC-layer communications are with the first cell but that lower-than-RRC-layer communications by the UE are with the one of the plurality of physical cells.

21. The apparatus of claim 18, wherein the instructions are further executable by the processor to cause the apparatus to:
identify that the first cell is a virtual cell.

22. The apparatus of claim 18, wherein the instructions are further executable by the processor to cause the apparatus to:

monitor for at least one of a synchronization signal block (SSB) or a system information block (SIB) of the first cell; and identify, based at least in part on the SSB or SIB of the first cell, that transmissions from the first cell are limited to either broadcast only or selective unicast.

23. The apparatus of claim 18, wherein the instructions to connect with one of the plurality of physical cells are executable by the processor to cause the apparatus to:

receive a radio resource control (RRC) configuration; and identify, based at least in part on the RRC configuration, that transmissions from the first cell are UE-specific transmissions.

24. The apparatus of claim 18, wherein the instructions are further executable by the processor to cause the apparatus to:

receive, from the first cell, at least one of a master information block (MIB) or a system information block (SIB) of the plurality of physical cells of the first cell.

25. The apparatus of claim 18, wherein the instructions are further executable by the processor to cause the apparatus to:

receive an indication that transmissions from the first cell are limited to either broadcast only or selective unicast; and fail to interpret the indication due to lack of support by the UE for virtual cell connections.

26. The apparatus of claim 18, wherein the instructions are further executable by the processor to cause the apparatus to:

receive an indication that transmissions from the first cell are limited to either broadcast only or selective unicast; and interpret the indication based at least in part on the UE having support for virtual cell connections.

27. An apparatus for wireless communication at a user equipment (UE), comprising:

means for identifying a first cell for the UE to connect to, the first cell being a virtual cell with a coverage area that includes a plurality of physical cells and corresponding physical cell coverage areas;

means for initiating a transition to a connected mode with the first cell via a random access procedure; and means for connecting with one of the plurality of physical cells during the random access procedure and based at least in part on the first cell being the virtual cell and the UE attempting to transition to the connected mode with the first cell, wherein connecting with one of the plurality of physical cells during the random access procedure comprises: receiving a random access response from the first cell, wherein the random access response includes a timing advance and an uplink resource grant for communications with the one of the plurality of physical cells.

28. A non-transitory computer-readable medium storing code for wireless communication at a user equipment (UE), the code comprising instructions executable by a processor to:

identify a first cell for the UE to connect to, the first cell being a virtual cell with a coverage area that includes a plurality of physical cells and corresponding physical cell coverage areas;

initiate a transition to a connected mode with the first cell via a random access procedure; and connect with one of the plurality of physical cells during the random access procedure and based at least in part on the first cell being the virtual cell and the UE attempting to transition to the connected mode with the first cell, wherein connecting with one of the plurality of physical cells during the random access procedure comprises: receiving a random access response from the first cell, wherein the random access response includes a timing advance and an uplink resource grant for communications with the one of the plurality of physical cells.

\* \* \* \* \*